(12) United States Patent
Zhou et al.

(10) Patent No.: US 12,443,238 B2
(45) Date of Patent: Oct. 14, 2025

(54) DISPLAY ASSEMBLY AND ELECTRONIC DEVICE

(71) Applicant: Honor Device Co., Ltd., Shenzhen (CN)

(72) Inventors: Guotong Zhou, Shenzhen (CN); Kunpeng Zhu, Shenzhen (CN); Bo Liu, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 18/250,449

(22) PCT Filed: Jul. 26, 2022

(86) PCT No.: PCT/CN2022/107955
§ 371 (c)(1),
(2) Date: Apr. 25, 2023

(87) PCT Pub. No.: WO2023/138017
PCT Pub. Date: Jul. 27, 2023

(65) Prior Publication Data
US 2025/0076926 A1    Mar. 6, 2025

(30) Foreign Application Priority Data
Jan. 18, 2022  (CN) .......................... 202220150786.5

(51) Int. Cl.
*G06F 1/16*    (2006.01)

(52) U.S. Cl.
CPC .......... *G06F 1/1652* (2013.01); *G06F 1/1641* (2013.01); *G06F 1/1656* (2013.01)

(58) Field of Classification Search
CPC ..... G06F 1/1652; G06F 1/1641; G06F 1/1656
See application file for complete search history.

(56) References Cited

U.S. PATENT DOCUMENTS

| | | | |
|---|---|---|---|
| 10,747,269 B1 * | 8/2020 | Choi | G06F 1/1652 |
| 11,176,851 B2 | 11/2021 | Wang et al. | |
| 11,282,416 B2 * | 3/2022 | Huang | G09F 9/301 |
| 11,622,035 B1 * | 4/2023 | Deng | H04M 1/185 |
| | | | 455/566 |
| 11,841,746 B2 | 12/2023 | Kang et al. | |
| 12,167,549 B2 * | 12/2024 | Wang | G06F 1/1624 |

(Continued)

FOREIGN PATENT DOCUMENTS

| | | |
|---|---|---|
| CN | 106095000 A1 | 11/2016 |
| CN | 208141720 U | 11/2018 |

(Continued)

*Primary Examiner* — Rockshana D Chowdhury
(74) *Attorney, Agent, or Firm* — Slater Matsil, LLP

(57) ABSTRACT

A display assembly includes a display panel and a support plate. The support plate is disposed on a non-light-exit side of the display panel, and the support plate includes at least one first part, and the first part is flat. The first part includes a plane part and a groove part connected to each other, a plurality of grooves are disposed on a side, away from the display panel, of the groove part, and a depth of the groove is less than a thickness of the plane part in a thickness direction of the display panel. The display assembly and electronic device are configured to display an image.

20 Claims, 19 Drawing Sheets

(56) References Cited

U.S. PATENT DOCUMENTS

| | | | |
|---|---|---|---|
| 2015/0122427 A1* | 5/2015 | Koo .................. | B32B 43/006 |
| | | | 156/707 |
| 2016/0091931 A1 | 3/2016 | Montevirgen et al. | |
| 2018/0190906 A1* | 7/2018 | Takeda ................ | C23C 14/042 |
| 2020/0227678 A1* | 7/2020 | Seo ..................... | H10K 59/12 |
| 2020/0265758 A1* | 8/2020 | Huang ................. | G09F 9/301 |
| 2020/0319672 A1 | 10/2020 | Kim et al. | |
| 2020/0389986 A1* | 12/2020 | Tsuchihashi ......... | G06F 1/1626 |
| 2021/0118337 A1* | 4/2021 | Park .................... | G09F 9/301 |
| 2021/0217975 A1* | 7/2021 | Gu ...................... | G09F 9/30 |
| 2021/0405703 A1* | 12/2021 | Song ................... | G06F 1/1694 |
| 2022/0253103 A1* | 8/2022 | Choi ................... | G06F 1/1624 |
| 2022/0309964 A1 | 9/2022 | Wang et al. | |
| 2023/0035622 A1 | 2/2023 | Kang et al. | |

FOREIGN PATENT DOCUMENTS

| | | |
|---|---|---|
| CN | 110062077 A | 7/2019 |
| CN | 110649058 A | 1/2020 |
| CN | 111756889 A | 10/2020 |
| CN | 112164318 A | 1/2021 |
| CN | 113257123 A | 8/2021 |
| CN | 113257124 A | 8/2021 |
| CN | 113724631 A | 11/2021 |
| KR | 20130004438 U | 7/2013 |
| TW | 201837578 A | 10/2018 |
| WO | 2021137480 A1 | 7/2021 |

* cited by examiner

DISPLAY ASSEMBLY AND ELECTRONIC DEVICE

CROSS-REFERENCE TO RELATED APPLICATIONS

This application is a national stage of International Application No. PCT/CN2022/107955, filed on Jul. 26, 2022, which claims priority to Chinese Patent Application No. 202220150786.5, filed on Jan. 18, 2022. The disclosures of both of the aforementioned applications are hereby incorporated by reference in their entireties.

TECHNICAL FIELD

This application relates to the field of display technologies, and in particular, to a display assembly and an electronic device.

BACKGROUND

With the development of science and technology, a bendable flexible screen has emerged, so that more product forms of electronic devices can be developed.

In the related technologies, a protective cover plate of an electronic device is usually bendable and has a small thickness, which causes poor impact resistance of the protective cover plate. Therefore, at present, a support plate is disposed on the back of the flexible screen, to support and protect the flexible screen by using the support plate and increase the impact resistance of the electronic device.

However, the support plate has a great density and area, which causes a large weight of the support plate, and further leads to a large increase in an overall weight of the electronic device.

SUMMARY

Embodiments of this application provide a display assembly and an electronic device, and are used to reduce a weight of the display assembly and the electronic device.

To achieve the foregoing objective, the following technical solutions are used in the embodiments of this application.

According to a first aspect, a display assembly is provided. The display assembly includes a display panel and a support plate. The support plate is disposed on a non-light-exit side of the display panel. The support plate includes at least one first part, and the first part is flat. The first part includes a plane part and a groove part connected to each other, a plurality of grooves are disposed on a side, away from the display panel, of the groove part, and a depth of the groove is less than a thickness of the plane part in a thickness direction of the display panel.

According to the display assembly provided in some embodiments of this application, the support plate is disposed on the non-light-exit side of the display panel, the groove part is disposed in the first part of the support plate, grooves are disposed on a side, away from the display panel, of the groove part, and the depth of the groove is limited in a thickness direction of the display panel. In this way, the depth of the groove is less than the thickness of the plane part, and the weight of the support plate can be reduced effectively while good impact resistance of the support plate is ensured. Therefore, the weight of the display assembly and the weight of the electronic device using the display assembly can be reduced while the good impact resistance of the display assembly is ensured.

In a possible implementation of the first aspect, the plane part includes at least one adsorption sub-part. The at least one adsorption sub-part and the plurality of grooves G in a groove part are staggered. A side surface, away from the display panel, of the adsorption sub-part panel is a first surface, and the first surface is a continuous plane. In this way, a module including the display panel, the support plate, the protective cover plate, the flexible printed circuit board, a COP outlet line or chip on film, and an adhesive may be taken out of an accommodating housing by a vacuum adsorption ball, to prevent the module from being picked up (withdrawn) by hand of an employee, thus reducing a damage rate of the module. In addition, air leakage between an adsorption ball chuck and a side surface, away from the display panel, of the adsorption sub-part can be prevented, and it can be prevented that the module cannot be taken out of the accommodating housing through adsorption by the vacuum adsorption ball.

In a possible implementation of the first aspect, a part in the plane part except the adsorption sub-part is a set part, and a side surface, away from the display panel, of the set part is a second surface. The first surface is flush with the second surface. In the thickness direction of the display panel, a thickness of the adsorption sub-part is equal to a thickness of the set part. In this way, the vacuum adsorption ball is configured to pick up the module, to reduce the damage rate of the module, and formation of a difference in level between a side surface, of the adsorption sub-part, close to the display panel and a side surface, of the set part of the plane part, close to the display panel can be prevented, and an adverse effect on structural stability of the display panel can be prevented.

In a possible implementation of the first aspect, the adsorption sub-part does not overlap the groove. In addition or alternatively, a spacing exists between the adsorption sub-part and the groove. This helps to ensure that the adsorption sub-part and the plurality of grooves in the groove part are staggered, and that the first surface of the adsorption sub-part is a continuous plane.

In a possible implementation of the first aspect, a shape of the adsorption sub-part includes a circle, a square, a ring, or a frame. In this way, while the vacuum adsorption ball is configured to pick up the module, it can be ensured that intensity of pressure may be generated between each position of the adsorption sub-part and the adsorption ball chuck, to prevent air leakage.

In a possible implementation of the first aspect, the adsorption sub-part surrounds at least one groove.

In a possible implementation of the first aspect, a shape of a connecting line of ends, close to the adsorption sub-part, of the plurality of grooves, is complementary to a shape of a boundary, close to the plurality of grooves, of the adsorption sub-part. In this way, it can be ensured that the vacuum adsorption ball can successfully adsorb and pick up the module, and the groove may have a relatively great area ratio in the first part, reducing the weight of the support plate.

In a possible implementation of the first aspect, the groove part includes at least two first groove groups, each first groove group includes at least two grooves, and the adsorption sub-part is located between the at least two first groove groups. This helps to dispose the adsorption sub-part at a position close to a center of the support plate or the module. When the module is picked up by the vacuum adsorption ball, it can be prevented that the module is inclined to a great extent.

In a possible implementation of the first aspect, the groove part further includes a second groove group. The second groove group includes at least two grooves and is located between the at least two first groove groups. The adsorption sub-part surrounds the second groove group. In this way, while the module is adsorbed and picked up by the vacuum adsorption ball, the weight of the support plate can be further reduced.

In a possible implementation of the first aspect, the groove part includes a separation sub-part between two adjacent grooves, and the separation sub-part and the adsorption sub-part are connected to each other and have an integral structure. This not only helps to reduce a difficulty in forming the adsorption sub-part, but also reduce the amount of solution for forming the groove through etching, thereby reducing costs.

In a possible implementation of the first aspect, the display assembly further includes: a protective cover plate, middle frame, and flexible printed circuit board. The protective cover plate is disposed on a side, away from the support plate, of the display panel, the middle frame is disposed on a side, away from the display panel, of the support plate, and the flexible printed circuit board is bound to the display panel. The flexible printed circuit board is located between the support plate and the middle frame, and an orthogonal projection of the flexible printed circuit board on the support plate and at least one adsorption sub-part are staggered. In this way, it can be prevented that the flexible printed circuit board shields the adsorption sub-part, and an adverse impact on adsorption and pickup of the module by the vacuum adsorption ball can be further prevented.

In a possible implementation of the first aspect, a ratio of a spacing between two adjacent grooves to a dimension of the groove in a set direction is greater than or equal to 2:3. The set direction is a direction parallel to a plane where the first part is located. In this way, it can be ensured that a part, between any two adjacent grooves, in the first part can provide relatively good support.

In a possible implementation of the first aspect, a spacing between two adjacent grooves is greater than or equal to a dimension of the groove in a set direction. In this way, a ratio of an area of a part, between two adjacent grooves, in the first part can be increased, and a support effect of the support plate can be ensured.

In a possible implementation of the first aspect, the groove includes a bottom surface and a side surface connected to the bottom surface. An angle between the bottom surface and the side surface is greater than or equal to 90°. In this way, when the angle is equal to 90°, it helps to prepare and form the groove G, or when the angle is greater than 90°, stress concentration at a joint of the bottom surface and the side surface can be prevented, which helps to prolong service life of the support plate.

In a possible implementation of the first aspect, a plurality of grooves are arranged in an array. In this way, arrangement regularity of the plurality of grooves G can be increased and a difficulty in preparing and forming the grooves G can be reduced.

In a possible implementation of the first aspect, a shape of an orthogonal projection of the grooves on the plane where the first part is located includes a strip shape, a curve, a circle, an ellipse, or a square. In this way, the weight of the support plate can be reduced effectively.

In a possible implementation of the first aspect, a shape of the orthogonal projection of the grooves on the plane where the first part is located includes a strip shape or a curve. In a vertical direction of a length direction of the groove, a plurality of grooves in the groove part are arranged in parallel and at intervals. In this way, arrangement regularity of the grooves can be increased, which helps to dispose relatively many grooves in the groove part and effectively reduce the weight of the support plate.

In a possible implementation of the first aspect, the support plate includes a plurality of first parts and at least one second part, and the second part is located between two adjacent first parts. The second part is bendable and is capable of driving an adjacent first part to rotate around the second part. In this way, the display assembly is foldable, and an electronic device using the display assembly is foldable.

In a possible implementation of the first aspect, the display panel has a plurality of first display parts and at least one second display part. The second display part is located between two adjacent first display parts, the first display part is opposite to the first part, and the second display part is opposite to the second part. In this way, when the second display part is bent, the second part will also be bent, and the first part will support the first display part, and the second part will support the second display part.

In a possible implementation of the first aspect, a plurality of openings are disposed in the second part. In this way, the plurality of openings may be configured to reduce stress concentration in the second part, and the weight of the support plate can be reduced.

According to a second aspect, some embodiments of this application provide an electronic device, including: the display assembly as described in any possible implementation of the first aspect.

For technical effects brought by the second aspect, reference may be made to the technical effects brought by different design manners in the first aspect, and details are not described herein again.

According to a third aspect, a display assembly is provided. The display assembly includes a display panel and a support plate. The support plate is disposed on a non-light-exit side of the display panel. The support plate includes a plurality of first parts and at least one second part, where the second part is located between two adjacent first parts, the first part is flat, the second part is bendable, and the first part is capable of rotating around the second part. A plurality of grooves are disposed on a side, away from the display panel, of the first part, where a depth of the groove is less than a thickness of the support plate in a third direction, and the third direction is a thickness direction of the display panel; and a first spacing exists between an edge of the groove and an edge of the first part in a second direction, and the second direction is a direction parallel to a rotation axis of the first part.

According to the display assembly provided in some embodiments of this application, the support plate is disposed on the non-light-exit side of the display panel, a plurality of grooves is disposed on a side, away from the display panel, of the first part of the support plate, and a depth of the groove is limited in a thickness direction of the display panel. In this way, the depth of the groove is less than the thickness of the support plate, and a first spacing exists between the edge of the groove and the edge of the first part in the second direction. Therefore, the weight of the support plate can be reduced effectively while good impact resistance of the support plate is ensured. Further, the weight of the display assembly and the weight of the electronic device using the display assembly can be reduced while the good impact resistance of the display assembly is ensured.

In a possible implementation of the third aspect, a ratio of a sum of areas of the plurality of grooves to an area of the first part is less than or equal to 1:2. In this way, the plurality of grooves occupy 50% of the area of the first part, and because the first spacing exists between the edge of the groove and the edge of the first part, while the support strength of the support plate is ensured, the weight of the support plate can be reduced to the greatest extent, to reduce the weight of the display assembly.

In a possible implementation of the third aspect, the first spacing is M, and M≥0.2 mm.

In a possible implementation of the third aspect, the first spacing M≥1 mm.

In a possible implementation of the third aspect, a second spacing N exists between an edge of the groove and an edge of the first part in a first direction, N≥0.2 mm. The first direction is perpendicular to the second direction and the third direction.

In a possible implementation of the third aspect, the second spacing N≥1 mm.

In a possible implementation of the third aspect, a ratio of a spacing between two adjacent grooves to a dimension of the groove in a set direction is greater than or equal to 2:3. The set direction is parallel to a plane where the first part is located. In this way, it can be ensured that a part, between any two adjacent grooves, in the first part can provide relatively good support.

In a possible implementation of the third aspect, a spacing between two adjacent grooves is greater than or equal to a dimension of the groove in a set direction. That is, a ratio of the spacing between two adjacent grooves to the dimension of the groove in the set direction is greater than or equal to 1:1. In this way, a ratio of an area of a part, between two adjacent grooves, in the first part can be increased, and a support effect of the support plate can be ensured.

In a possible implementation of the third aspect, the groove includes a bottom surface and a side surface connected to the bottom surface. An angle between the bottom surface and the side surface is greater than or equal to 90°. In this way, when the angle is equal to 90°, it helps to prepare and form the groove G, or when the angle is greater than 90°, stress concentration at a joint of the bottom surface and the side surface can be prevented, which helps to prolong service life of the support plate.

In a possible implementation of the third aspect, a plurality of grooves are arranged in an array. In this way, arrangement regularity of the plurality of grooves G can be increased and a difficulty in preparing and forming the grooves G can be reduced.

In a possible implementation of the third aspect, a shape of the orthogonal projection of the grooves on the plane where the first part is located includes a strip shape, a curve, a circle, an ellipse, or a square. In this way, the weight of the support plate can be reduced effectively.

In a possible implementation of the third aspect, a shape of the orthogonal projection of the grooves on the plane where the first part is located includes a strip shape or a curve. The plurality of grooves are arranged in parallel and at intervals in the first direction, and the first direction is perpendicular to the second direction and the third direction. In this way, arrangement regularity of the grooves can be increased, which helps to dispose relatively many grooves in the groove part and effectively reduce the weight of the support plate.

In a possible implementation of the third aspect, a spacing between at least two grooves is not equal to a spacing between others of the grooves in the first direction. In this way, different spacings may be set between adjacent grooves, to meet different design requirements.

In a possible implementation of the third aspect, the display panel has a plurality of first display parts and at least one second display part. The second display part is located between two adjacent first display parts, the first display part is opposite to the first part, and the second display part is opposite to the second part. In this way, when the second display part is bent, the second part will also be bent, and the first part will support the first display part, and the second part will support the second display part.

In a possible implementation of the third aspect, a plurality of openings are disposed in the second part. In this way, the plurality of openings may be configured to reduce stress concentration in the second part, and the weight of the support plate can be reduced.

According to a fourth aspect, some embodiments of this application provide an electronic device, including: the display assembly as described in any possible implementation of the third aspect.

For technical effects brought by the fourth aspect, reference may be made to the technical effects brought by different design manners in the third aspect, and details are not described herein again.

According to a fifth aspect, a display assembly is provided. The display assembly includes a display panel and a support plate. The support plate is disposed on a non-light-exit side of the display panel. The support plate includes plurality of first parts and at least one second part, where the second part is located between two adjacent first parts, the first part is flat, the second part is bendable, and the first part is capable of rotating around the second part. At least one groove is disposed on a side, away from the display panel, of the first part, where a depth of the groove is less than a thickness of the support plate in a third direction, and the third direction is a thickness direction of the display panel; and at least one edge of the groove does not penetrate an edge of the first part in a second direction, and the second direction is a direction parallel to a rotation axis of the first part.

For technical effects brought by the fifth aspect, reference may be made to the technical effects brought by the third aspect, and details are not described herein again.

In a possible implementation of the fifth aspect, a plurality of grooves are disposed at intervals on a side, away from the display panel, of the first part.

In a possible implementation of the fifth aspect, a first spacing exists between an edge of each groove and the edge of the first part in the second direction.

REFERENCE NUMERALS

Figure 1:
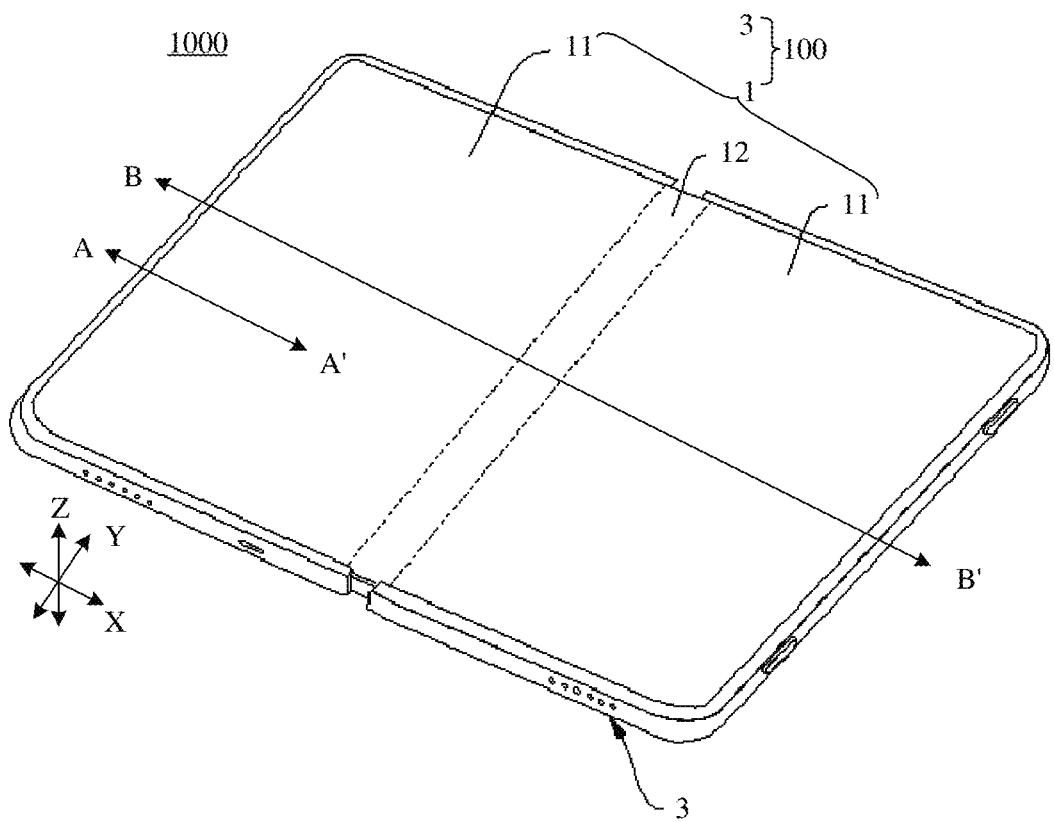
FIG. 1 is a schematic structural diagram of an electronic device in a fully unfolded state according to an embodiment of this application.

| | | |
|---|---|---|
| 1000. electronic device | 100. display assembly | 200. front cover |
| 1. display panel | 11. first display part | 12. second display part |
| 2. support plate | 21. first part | 22. second part |
| 211. plane part | 212. groove part | 213. adsorption sub-part |
| 3. middle frame | 4. protective cover plate | 5. flexible printed circuit board |
| 51. device | 6. COP outlet line or chip on film | 7. adhesive |
| 8. through hole | G. groove | G1. first groove group |
| G2. second groove group | Ga. first groove | Gb. second groove |
| H. separation sub-part | K. opening | |

DETAILED DESCRIPTION OF ILLUSTRATIVE EMBODIMENTS

The following describes technical solutions in embodiments of this application with reference to accompanying drawings in embodiments of this application. Apparently, the described embodiments are merely some rather than all embodiments of this application.

In the embodiments of this application, terms "first" and "second" are used merely for the purpose of description, and shall not be construed as indicating or implying relative importance or implying a quantity of indicated technical features. Therefore, a feature limited by "first" or "second" may explicitly or implicitly include one or more of the features.

In the embodiments of this application, the term "include", "have", or any other variant thereof is intended to cover non-exclusive inclusion, so that a process, a method, an article, or an apparatus that includes a series of elements includes not only those elements but also other elements that are not explicitly listed, or includes elements inherent to such process, method, article, or apparatus. In a case without more restrictions, for an element limited by the statement "include a . . . ", a process, a method, an article, or an apparatus that includes the element may further include another same element.

In this application, unless otherwise specified and defined, the term "connection" should be understood in a broad sense. For example, a "connection" may be a fixed connection, may be a detachable connection, or may be integration, and may be a direct connection or an indirect connection implemented by using an intermediate medium. In addition, the term "coupled" may be an electrical connection manner for implementing signal transmission. "Coupled" may be a direct electrical connection, or an indirect electrical connection through an intermediary.

In the embodiments of this application, "and/or" indicates merely an association relationship for describing associated objects and represents the presence of three relationships. For example, A and/or B may represent the presence of three cases: only A, both A and B, and only B. In addition, the symbol "/" in this specification usually indicates an "or" relationship between the associated objects.

Moreover, the use of "based on" means open and inclusive, since a process, a step, calculation or other actions "based on" one or more of the conditions or values may be based on an additional condition or exceed the stated values in practice.

The term "about", "substantially", or "approximately" as used herein includes a stated value and an average value within an acceptable range of deviation of a particular value, and the acceptable range of deviation is determined by a person of ordinary skill in the art while considering measurement in question and errors associated with measurement of a particular quantity (that is, limitations of a measurement system).

Exemplary implementations are described herein with reference to sectional views and/or plan views as idealized exemplary accompanying drawings. In the accompanying drawings, thicknesses of a layer and a region are increased for clarity. Therefore, variations on shapes relative to that in the accompanying drawings due to, for example, manufacturing technologies and/or tolerances, may be contemplated. Therefore, example implementations should not be construed as being limited to shapes of the regions shown herein, but include a shape deviation due to, for example, manufacturing. For example, an etched region shown as a rectangle generally has a curved feature. Therefore, the regions shown in the accompanying drawings are schematic in nature, and shapes of the regions are not intended to show an actual shape of a region of a device and are not intended to limit the scope of example implementations.

This application provides an electronic device. The electronic device is, for example, a type of electronic devices with a flexible display panel. For example, the flexible display panel is bendable. For example, two relative ends or a middle part of the flexible display panel are bendable.

In some examples, the electronic device includes but is not limited to a notebook (notebook), a tablet personal computer (tablet personal computer), a mobile phone (mobile phone), a laptop computer (laptop computer), a personal digital assistant (personal digital assistant, PDA), a personal computer, a navigator, a vehicle-mounted device, a wearable device (such as a smart watch), an augmented reality (Augmented Reality, AR) device, a virtual reality (Virtual Reality, VR) device, and any other products or components with a display function. A specific form of an electronic device 1000 is not specially limited in this embodiment of this application.

Optionally, the electronic device may be an electroluminescent display device or a photoluminescent display device. In a case that the electronic device 1000 is the electroluminescent display device, the electronic device 1000 may be an organic electroluminescent (Organic Light Emitting Diode, OLED) display device or a quantum dot electroluminescent (Quantum Dot Light Emitting Diodes, QLED) display device. In a case that the electronic device 1000 is the photoluminescent display device, the electronic device 1000 may be a quantum dot photoluminescent display device.

For example, the electronic device may be a foldable electronic device. The foldable electronic device may include any electronic device having a foldable screen and capable of changing the foldable screen and the electronic device itself to an unfolded or folded mode. According to different usage requirements, the foldable electronic device may be unfolded to a fully unfolded state, may be folded to a folded state, or may be in an intermediate state between the fully unfolded state and the folded state. In other words, the foldable electronic device has at least two states: the fully unfolded state and the folded state. In some cases, the foldable electronic device may further include a third state: the intermediate state between the fully unfolded state and the folded state. It can be understood that the intermediate state is not only one state, but may be any one or more states of the foldable electronic device between the fully unfolded state and the folded state.

Figure 2:
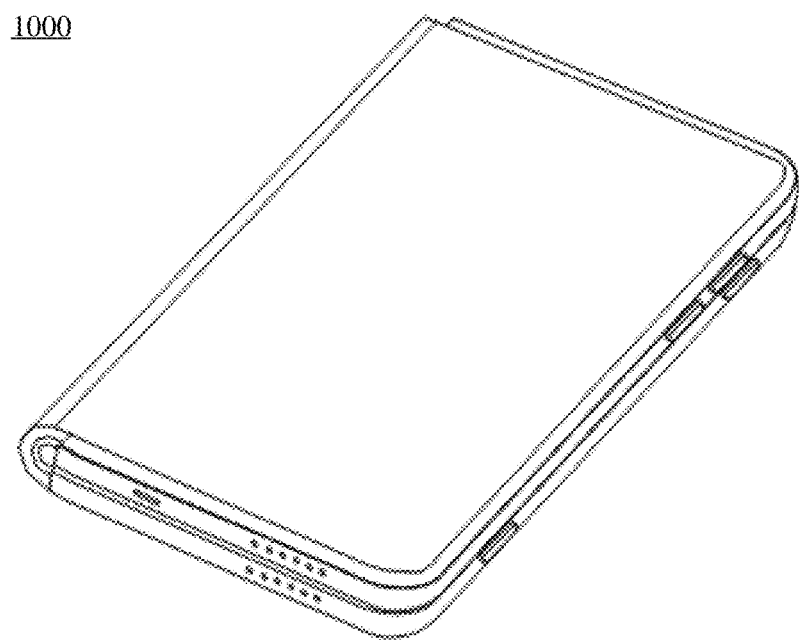
FIG. 2 is a schematic structural diagram of the electronic device in a folded state according to an embodiment of this application.
Figure 3:
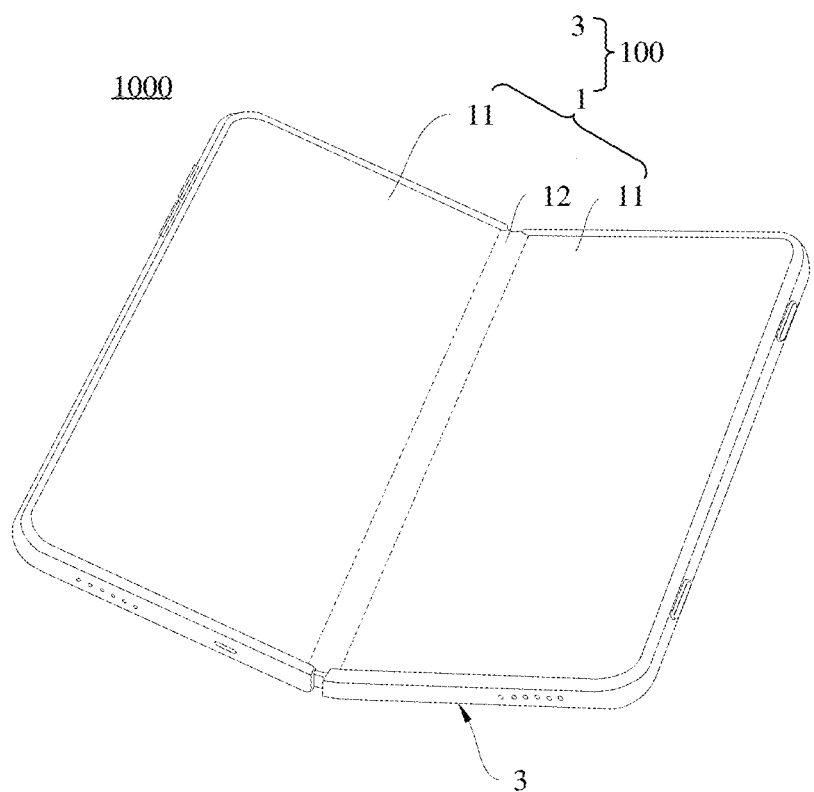
FIG. 3 is a schematic structural diagram of the electronic device in an intermediate state according to an embodiment of this application.

FIG. 1, FIG. 2, and FIG. 3 are perspective views of an electronic device 1000 according to some embodiments of this application. In this embodiment, the electronic device 1000 is a mobile phone with a foldable screen. FIG. 1 is a structural diagram of the electronic device 1000 in a fully unfolded state, FIG. 2 is a structural diagram of the electronic device 1000 in a folded state, and FIG. 3 is a structural diagram of the electronic device 1000 in an intermediate state.

Based on a difference in a folding direction of a display panel 1 in the electronic device 1000, the electronic device 1000 may be divided into an inner folding device and an outer folding device. The inner folding device means that the electronic device 1000 can be folded to a light exit side of the display panel 1. When the electronic device 1000 is in the folded state, the display panel 1 is located inside the electronic device 1000, and an image displayed by the display panel 1 cannot be viewed. When the electronic device 1000 is in the fully unfolded state, the display panel 1 is exposed and an image displayed by the display panel 1 can be viewed. The outer folding device means that the electronic device 1000 can be folded to a non-light-exit side of the display panel 1. When the electronic device 1000 is in the folded state, the display panel 1 is located outside the electronic device 1000, and an image displayed by the display panel 1 can be viewed.

It should be noted that the light exit side of the display panel 1 refers to a side on which the display panel 1 is configured to display an image. The non-light-exit side of the display panel 1 refers to a side in the display panel 1 opposite to the light exit side. For the display panel 1, reference may be made to the following description, and details are not described herein again.

Definitely, the electronic device may also be an electronic device with a curved screen. "Curved" means that two opposite ends of the electronic device are bent to the non-light-exit side, and a remaining part is flat. This helps to increase a viewing angle of the electronic device with a curved screen.

In some examples, the electronic device includes a display assembly, and the display assembly includes a display panel. The display panel is configured to display an image.

In a case that the electronic device is an OLED display device, the display panel is an OLED display panel. In a case that the electronic device is a QLED display device, the display panel is a QLED display panel. In a case that the electronic device is a quantum dot photoluminescent display device, the display panel is a quantum dot photoluminescent display panel.

For example, in the electronic device, the display panel is a flexible display panel, and the flexible display panel is bendable. That is, in a case that the electronic device is a foldable electronic device, the flexible display panel may be unfolded or folded accordingly while the electronic device is being unfolded or folded; and in a case that the electronic device is an electronic device with a curved screen, two opposite ends of the display panel are bent toward the non-light-exit side of the display panel, and a remaining part of the display panel is flat.

In some examples, the display assembly further includes a support plate disposed on the non-light-exit side of the display panel. The support plate includes at least one first part, and the first part is flat.

For example, the support plate may include one or more first parts. For example, in a case that the electronic device is an electronic device with a curved screen, the support plate may include one first part. In a case that the electronic device is a foldable electronic device, the support plate may include a plurality of first parts.

In some examples, the first part includes a plane part and a groove part connected to each other. A plurality of grooves are disposed on a side, away from the display panel, of the groove part. A depth of the groove is less than a thickness of the plane part in a thickness direction of the display panel.

In this application, the groove part is disposed in the first part of the support plate and grooves are disposed on the side, away from the display panel, of the groove part. Therefore, a weight of the support plate can be effectively reduced, and a weight of the display assembly and the electronic device can be further reduced.

Figure 4:
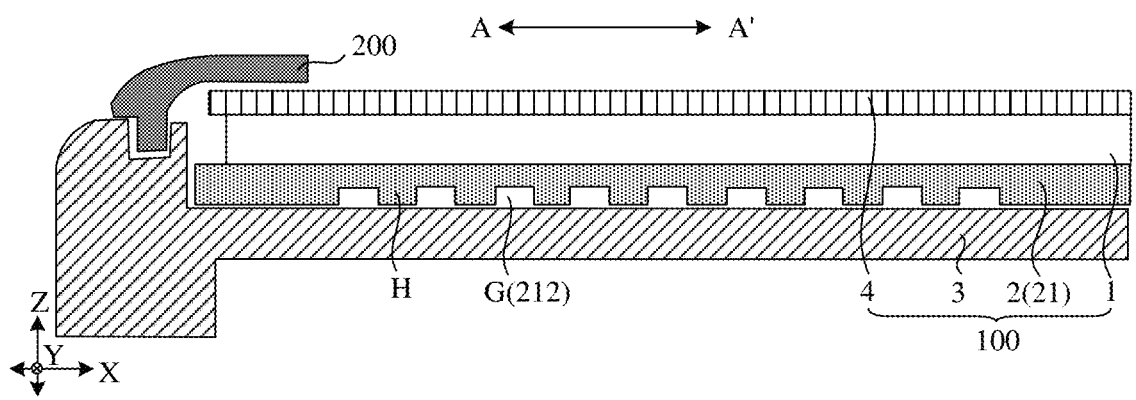
FIG. 4 is a partial sectional view of the electronic device in FIG. 1 in a direction A-A'.
Figure 5:
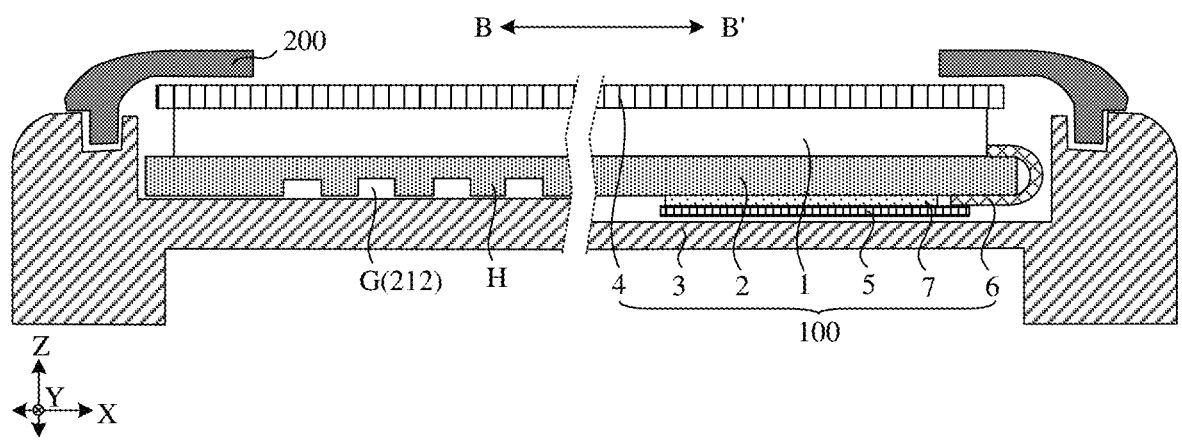
FIG. 5 is partial sectional view of the electronic device in FIG. 1 in a direction B-B'.

The electronic device 1000 is, for example, a mobile phone with a foldable screen, and a structure of the electronic device 1000 will be schematically described with reference to the following drawings. FIG. 1, FIG. 2, and FIG. 3 respectively show an overall structure of the electronic device 1000, FIG. 4 shows a sectional structure of the electronic device 1000 shown in FIG. 1 in a direction A-A', and FIG. 5 shows a partial sectional structure of the electronic device 1000 shown in FIG. 1 in a direction B-B'. A fold-line-shape dashed line in FIG. 5 represents that a part of the structure of the electronic device 1000 is omitted.

In some examples, as shown in FIG. 1, FIG. 3, FIG. 4, and FIG. 5, the electronic device 1000 includes a display assembly 100, and the display assembly 100 includes a display panel 1.

For example, the display panel 1 may have a plurality of first display parts 11, and each first display part 11 may be planar or flat. The display panel 1 may further have at least one second display part 12, and each first display part 11 is, for example, in a strip shape. The second display part 12 may be located between two adjacent first display parts 11, and the second display part 12 and the two adjacent first display part 11 are connected to each other and have an integral structure.

Optionally, while the electronic device 1000 is being folded, the second display part 12 is bent, the first display part 11 is basically not bent, and the first display part 11 can rotate around the second display part 12 connected to the first display part 11. When the electronic device 1000 is in the fully unfolded state, the display panel 1 is also in the fully unfolded state. The first display part 11 and the second display part 12 may be alternately arranged in a direction.

A quantity of the first display parts 11 and a quantity of the second display parts 12 may be determined based on a quantity of folding times of the electronic device 1000. For example, the electronic device 1000 is folded only once, and correspondingly, the quantity of the first display parts 11 may be two, and the quantity of the second display parts 12 may be one. For another example, the electronic device 1000 may be folded twice. Correspondingly, the quantity of the first display parts 11 may be three, and the quantity of the second display parts 12 may be two.

For example, as shown in FIG. 1 and FIG. 3, the display panel 1 has two first display parts 11 and one second display part 12. The second display part 12 is located between the two first display parts 11. As shown in FIG. 1, the first display part 11 and the second display part 12 may be alternately arranged in a first direction X, and the second display part 12 may extend in a second direction Y. As shown in FIG. 3, both the first display parts 11 can rotate around the second display part 12, that is, a rotation axis of the first display part 11 is parallel to the second direction Y. Therefore, the display panel 1 and the electronic device 1000 can be folded or unfolded. Both the first direction X and the second direction Y are parallel to a plane where the display panel 1 is located, and the first direction X and the second direction Y are perpendicular to each other. A third direction Z is a thickness direction of the display panel 1, and is perpendicular to both the first direction X and the second direction Y.

In some examples, as shown in FIG. 4 and FIG. 5, the display assembly 100 further includes a middle frame 3 disposed on the non-light-exit side of the display panel 1. The middle frame 3 may include a middle plate (such as a metal middle plate) and a frame disposed surround an edge of the metal middle plate. A thickness of the frame in a third direction Z is greater than that of the middle plate in the third direction Z. In the third direction Z, the middle plate and the frame form two opposite grooves. As shown in FIG. 5, the display panel 1 may be located in one of the grooves, and the light exit side of the display panel 1 is opposite to the middle plate.

For example, a manner of connection between the frame and the middle plate includes but is not limited to soldering, clamping, and integral injection molding. A material of the middle plate may include but is not limited to aluminum, aluminum alloy, stainless steel, or the like. A material of the frame may include but is not limited to metal, glass, plastic, ceramic, or the like.

It can be understood that the middle frame 3 may be rotated while the electronic device 1000 is being folded.

In some examples, as shown in FIG. 4 and FIG. 5, the display assembly 100 further includes a protective cover plate 4 disposed on the light exit side of the display panel 1. The protective cover plate 4 is configured to protect the display panel 1.

For example, the protective cover plate 4 may be bonded to a surface of the display panel 1 by sealant. The protective cover plate 4 may be made of a transparent film material, so that the protective cover plate 4 is bendable. The protective cover plate 4 can be folded accordingly while the electronic device 1000 is being folded. A material of the protective cover plate 4 includes but is not limited to polyimide and the like.

In some examples, as shown in FIG. 5, the display assembly 100 further includes a flexible printed circuit board 5 bound to the display panel 1. The flexible printed circuit board 5 may be located in a cavity enclosed by the display panel 1 and the middle frame 3.

Figure 14:
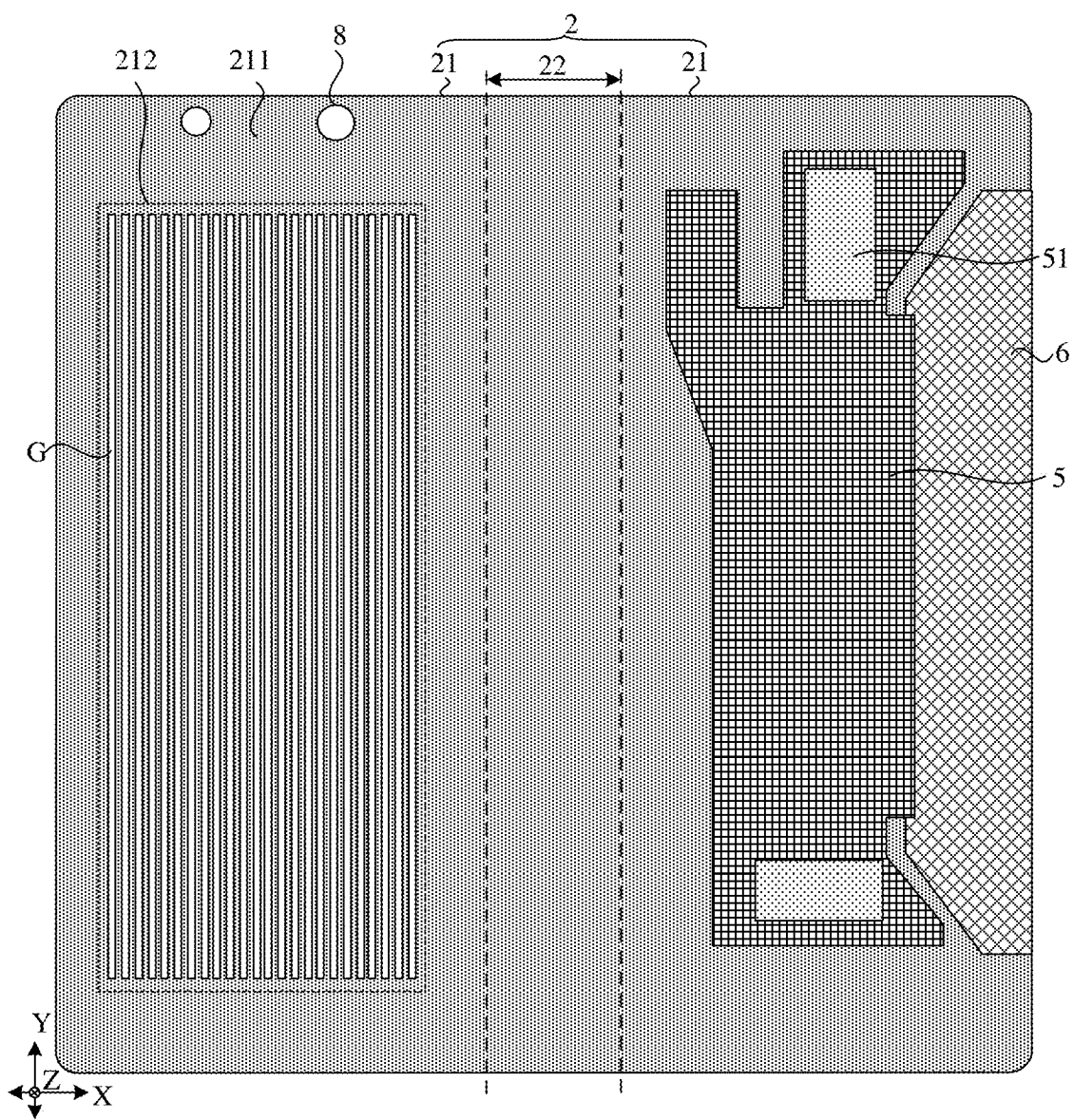
FIG. 14 is a bottom view of a support plate, flexible printed circuit board, and COP outlet line or chip on film in FIG. 5.
Figure 15:
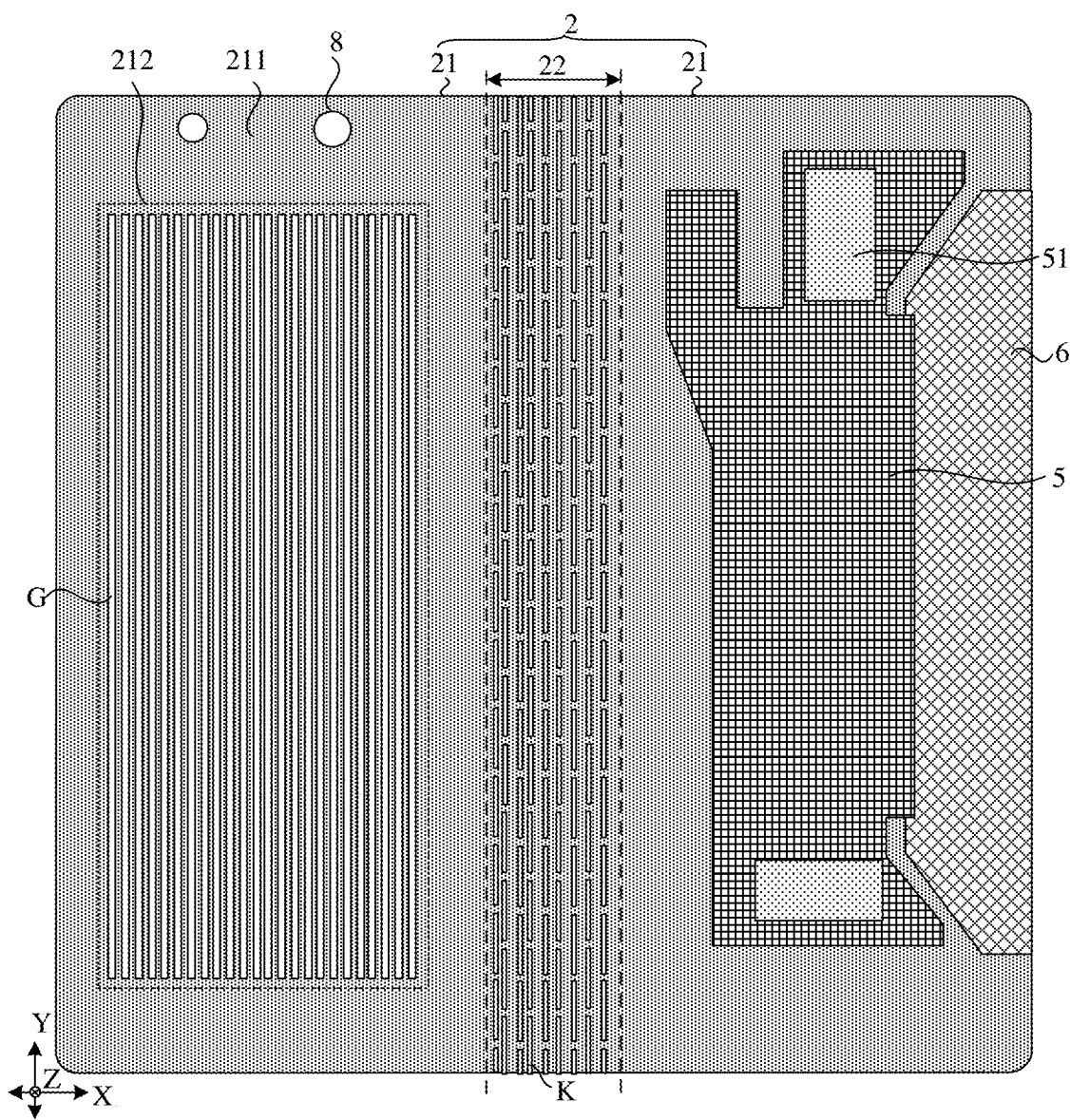
FIG. 15 is another bottom view of a support plate, flexible printed circuit board, and COP outlet line or chip on film in FIG. 5.

For example, as shown in FIG. 14, the flexible printed circuit board 5 may include a plurality of devices 51. The device 51 may include a resistor, a capacitor, an integrated circuit (Integrated Circuit, IC), or the like.

It can be understood that a plurality of binding ways are provided between the flexible printed circuit board 5 and the display panel 1. For example, the flexible printed circuit board 5 and the display panel 1 may be bound by a COP (Chip On Pi) binding process. In this case, the display assembly 100 may include a COP outlet line 6 connecting the flexible printed circuit board 5 and the display panel 1. For another example, the flexible printed circuit board 5 and the display panel 1 may be bound by a COF (Chip On Film) binding process. In this case, the display assembly 100 may include a chip on film 6 connecting the flexible printed circuit board 5 and the display panel 1.

In some examples, as shown in FIG. 4 and FIG. 5, the electronic device 1000 further includes a front cover 200. The front cover 200 may be located on a side, away from the middle frame 3, of the protective cover plate 4 and is connected to the middle frame 3. The front cover 200 may shield a connection position between the display panel 1 and the middle frame 3 and a connection position between the cover plate 4 and the middle frame 3. A spacing may exist between the front cover 200 and a surface of the protective cover plate 4, or the front cover 200 and the surface of the protective cover plate 4 may contact each other but be not sealed. In this way, it can be prevented, while the electronic device 1000 is being folded, that the front cover 200 hinders bending of the display panel 1 and the protective cover plate 4.

For example, a material of the front cover 200 may be an insulating material.

In some examples, the electronic device 1000 further includes a back cover, a battery, an optical device (such as an image collector), and the like. The back cover may be disposed on a side, away from the front cover 200, of the middle frame 3, and enclose a cavity with the middle frame 3. The battery, the optical device, and the like may be located in the cavity enclosed by the middle frame 3 and the back cover. As shown in FIG. 14, the optical device may collect light through a through hole 7 in a support plate 2. For the support plate 2, reference may be made to the following description, and details are not described herein again.

In some examples, as shown in FIG. 4 and FIG. 5, the display assembly 100 further includes the support plate 2. The support plate 2 is disposed on the non-light-exit side of the display panel 1 and is located between the display panel 1 and the middle frame 2. The support plate 2 and the display panel 1 may be bonded together, for example, by sealant.

It should be noted that a COP outlet line or chip on film 6 in the display assembly 100 may be bent between the support plate 2 and the middle frame 3. Therefore, the flexible printed circuit board 5 in the display assembly 100 is located between the support plate 2 and the middle frame 3. For example, the display assembly 100 further includes an adhesive 7, and the flexible printed circuit board 5 may be bonded to the support plate 2 by the adhesive 7.

When the display assembly 100 and the electronic device 1000 are impacted, the support plate 2 can provide support and protect the display assembly 100 and the electronic device 1000, to reduce an impact force on the display assembly 100.

In a case that the electronic device 1000 is an electronic device with a curved screen, the support plate 2 may be located, for example, between the back cover and the middle frame.

For example, the support plate 2 has good toughness. While the display panel 1 is being unfolded or folded, the support plate 2 may be unfolded or folded accordingly.

For example, the support plate 2 has good rigidity. The support plate 2 can support the display panel 1 and maintain a shape of the display panel 1. For example, when the display panel 1 is in the fully unfolded state, folded state, or intermediate state, the support plate 2 can keep the display panel 1 in the fully unfolded state, folded state, or intermediate state, to prevent a change in a state of the display panel 1.

The support plate 2 may include at least one second part 22, and each second part 22 is, for example, in a strip shape. The support plate 2 may further include a plurality of first parts 21, and each first part 21 may be flat. The second part 22 may be located between two adjacent first parts 22, and the second part 22 and the two adjacent first parts 21 are connected to each other and have an integral structure. It should be noted that the first part 21 is always flat when the display panel 1 is in the fully unfolded state, folded state, intermediate state, or any other state.

Optionally, while the electronic device 1000 is being folded, the second part 22 is bent, the first part 21 is basically not bent, and the first part 21 can rotate around the second part 22 connected to the first part 21. When the electronic device 1000 is in the fully unfolded state, the support plate 2 is also in the fully unfolded state. The first part 21 and the second part 22 may be alternately arranged in a direction.

For example, the first display part 11 of the display panel 1 is opposite to the first part 21 of the support plate 2, and the second display part 12 of the display panel 1 is opposite to the second part 22 of the support plate 2. Here, "opposite" means that an orthogonal projection of the first display part 11 on a plane where the display panel 1 is located at least partially overlaps an orthogonal projection of the first part 21 of the support plate 2 on the plane where the display panel 1 is located. An orthogonal projection of the second display part 12 on the plane where the display panel 1 is located at least partially overlaps an orthogonal projection of the second part 22 of the support plate 2 on the plane where the display panel 1 is located.

In this way, when the second display part 12 is bent, the second part 22 of the support plate 2 is also bent, that is, a rotation axis of the second part 22 of the support plate 2 is parallel to the second direction Y and is parallel to a rotation axis of the first display part 11. In addition, the second part 22 of the support plate 2 forms support on the second display part 12, and the first part 21 of the support plate 2 forms support on the first display part 11.

It can be understood that, in the support plate 2, a quantity of the first parts 21 is the same as that of the first display parts 11 in the display panel 1, and a quantity of the second parts 22 is the same as that of the second display parts 12 in the display panel 1.

Figure 6:
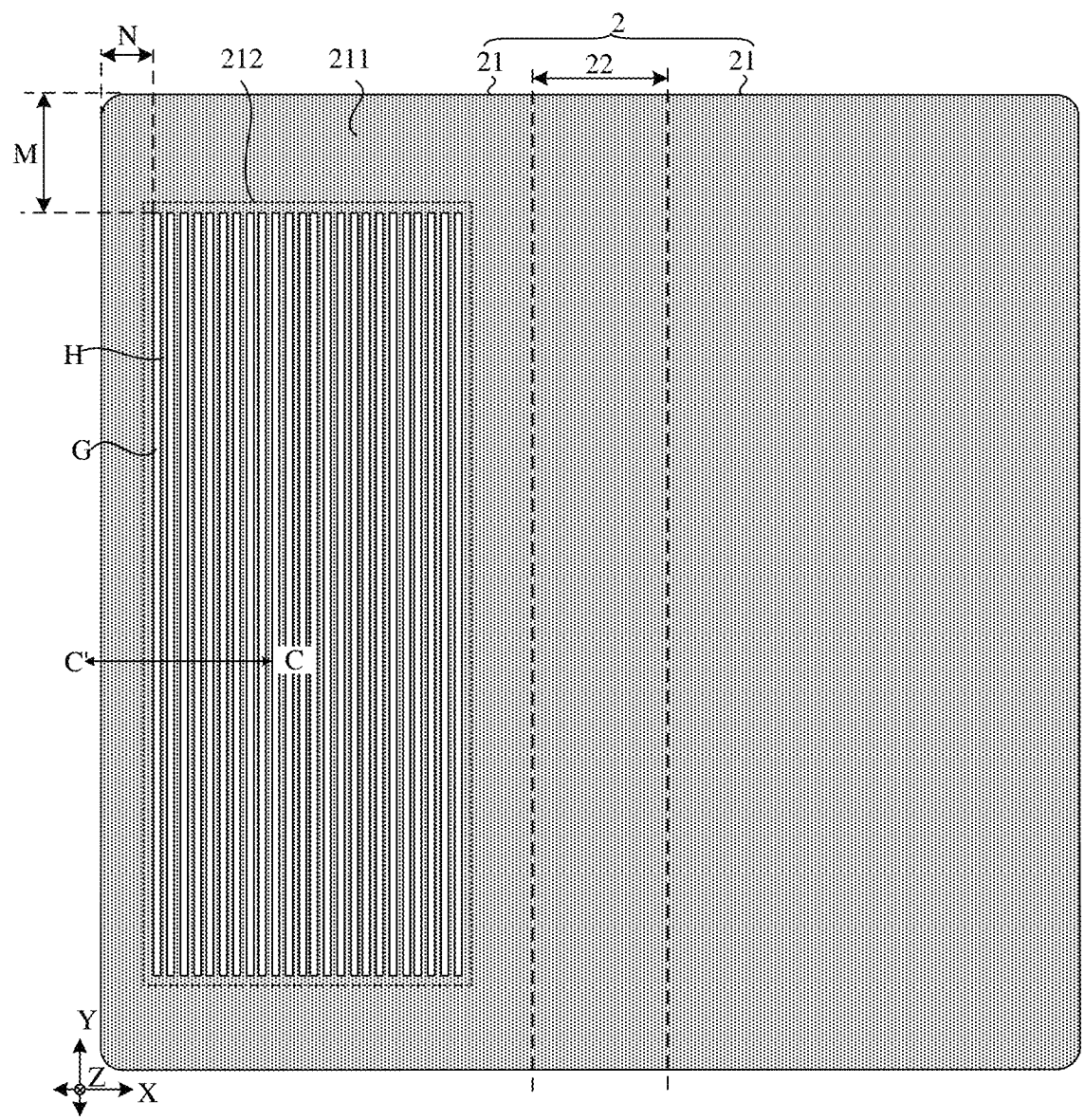
FIG. 6 is a schematic structural diagram of a support plate according to an embodiment of this application.

For example, as shown in FIG. 6, a support plate 2 has one second part 22 and two first parts 21. The second part 22 is located between the two first parts 21. The first part 21 and the second parts 22 may be alternately arranged in a first direction X, and the second part 22 may extend in a second direction Y.

A material of the support plate 2 includes, for example, a metal material. Optionally, the metal material may include stainless steel, titanium alloy, or the like. Definitely, the material of the support plate 2 may also include another material with certain toughness and rigidity.

Density of the metal material is relatively great, and an area of an orthogonal projection of the support plate 2 on a plane where a display panel 1 is located is relatively large. Therefore, the weight of the support plate 2 is relatively great, causing the weight of a display assembly 100 and an electronic device 1000 is relatively great.

Based on this, in some examples, as shown in FIG. 6 and FIG. 10 to FIG. 16, among a plurality of first parts 21 included in the support plate 2, at least one first part 21 includes a plane part 211 and a groove part 212. As shown in FIG. 4 and FIG. 5, a plurality of grooves G are disposed on a side, away from the display panel 1, of the groove part 212. In some embodiments, only one groove G is disposed on a side, away from the display panel 1, of the groove part 212.

For example, the plurality of grooves G in the groove part 212 are arranged at intervals. The groove part 212 further includes a separation sub-part H located between two adjacent grooves G, and the separation sub-part H is configured to separate grooves G on two opposite sides of the separation sub-part H. For example, the separation sub-part H and the plane part 211 are connected to each other and have an integral structure.

For example, a quantity of the first parts 21 provided with the groove part 212 may be one, two, or more. In the first part 21 provided with the groove part 212, one, two, or more groove parts 212 may be disposed.

Figure 10:
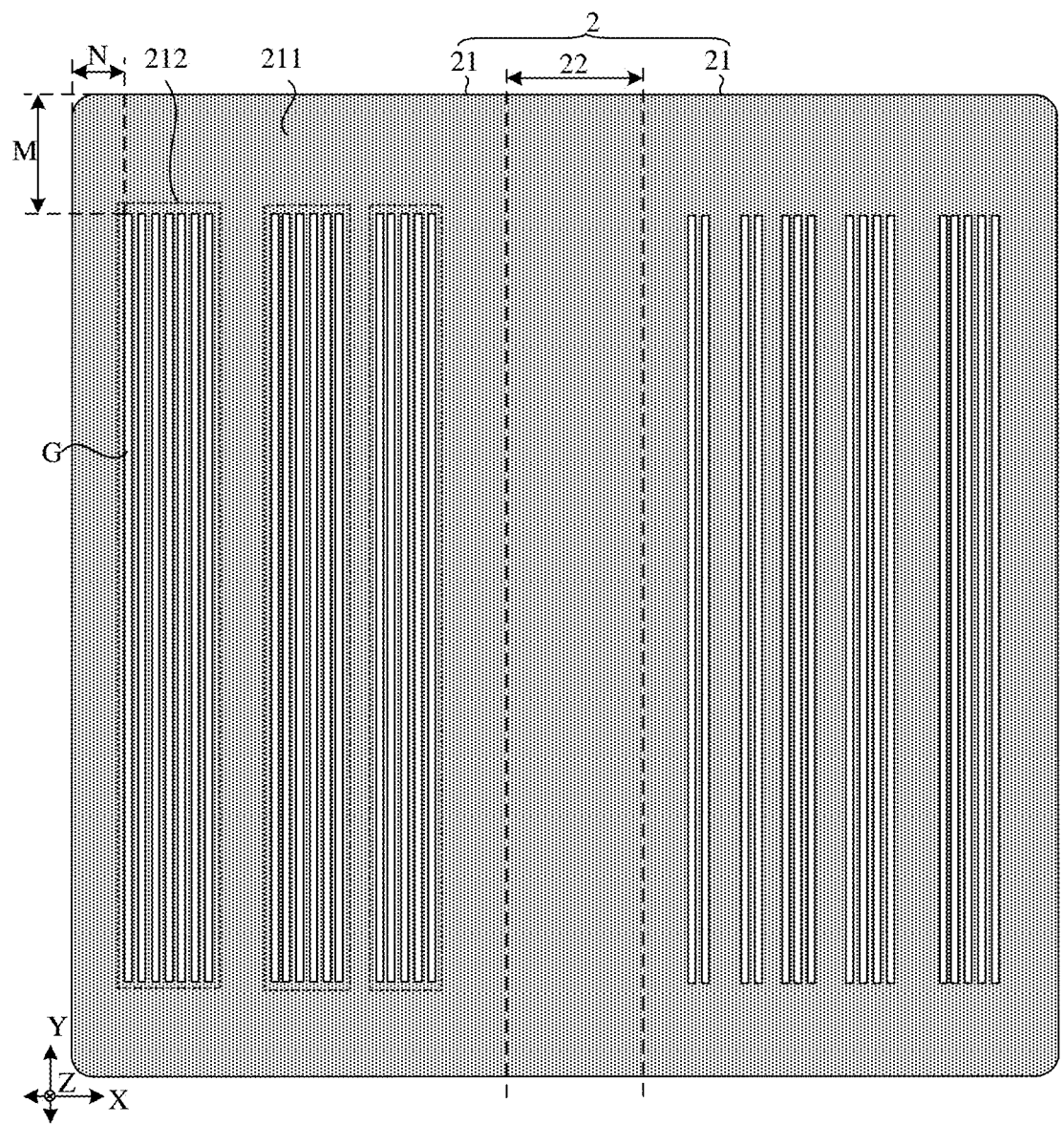
FIG. 10 is yet another schematic structural diagram of a support plate according to an embodiment of this application.
Figure 16:
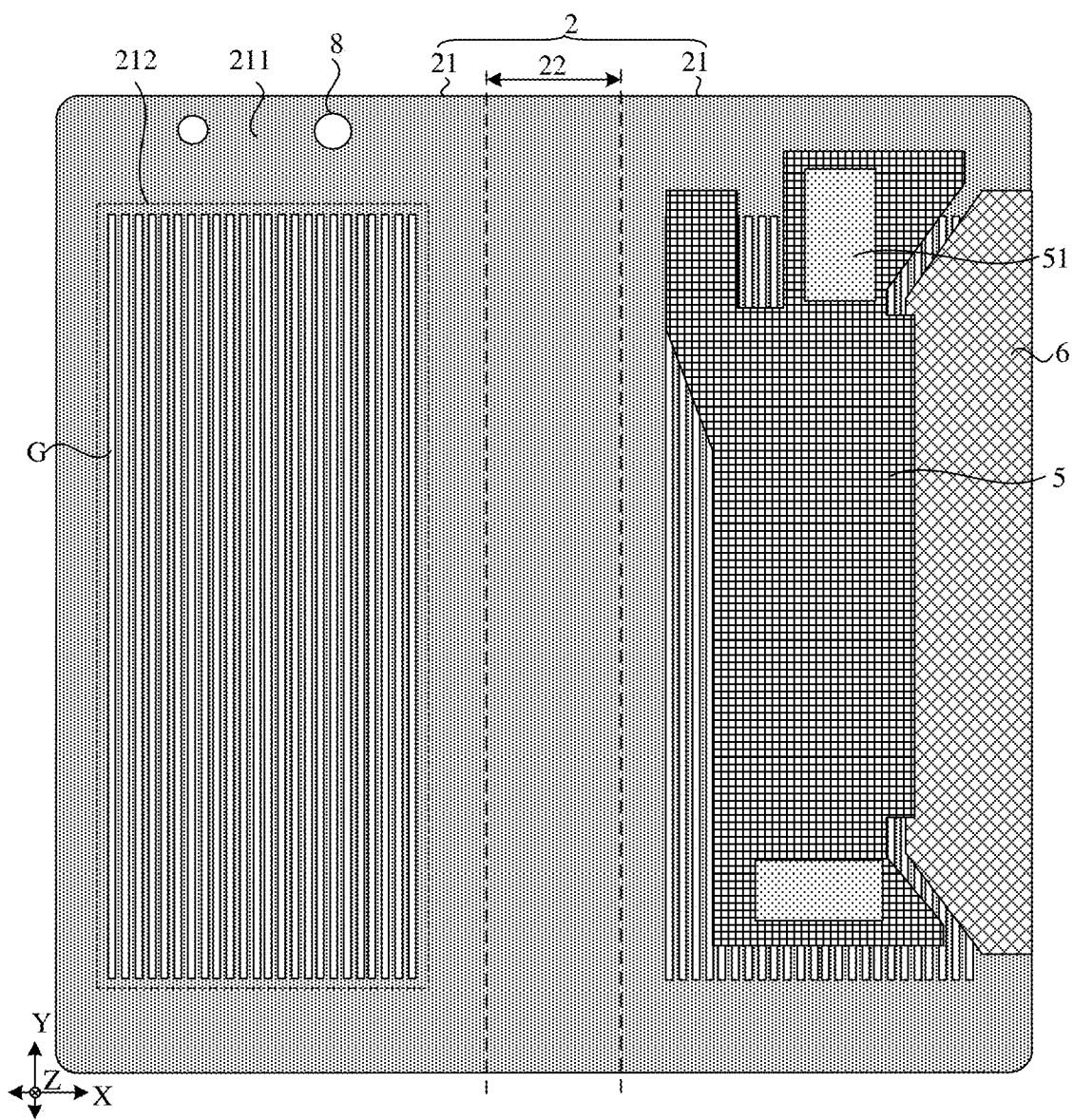
FIG. 16 is still another bottom view of a support plate, flexible printed circuit board, and COP outlet line or a chip on film in FIG. 5.

For example, the support plate 2 includes two first parts 21. As shown in FIG. 6 and FIG. 11 to FIG. 15, the groove part 212 is disposed in one of the two first parts 21. As shown in FIG. 10 and FIG. 16, the groove part 212 is provided in each of the two first parts 21. It can be understood that, compared with a support plate not provided with a groove, in this application, after a groove G is disposed in the first part 21, a part, of the support plate, not provided with a groove is removed. In this way, the part, of the support plate 2, not provided with the groove G may be configured to form a support, support for the display assembly 100 and the electronic device 100 can be provided, and increase impact resistance may be improved, and the weight of the support plate 2 can be reduced effectively. Therefore, the weight of the display assembly 100 and the electronic device 1000 can be reduced.

As shown in FIG. 4 to FIG. 5 and FIG. 7 to FIG. 8, the groove G is disposed on a side, away from the display panel 1, of the first part 21. In a direction perpendicular to a thickness of the display panel 1, that is, in a third direction Z, a depth of the groove G is less than a thickness of the plane part 211.

Figure 7:
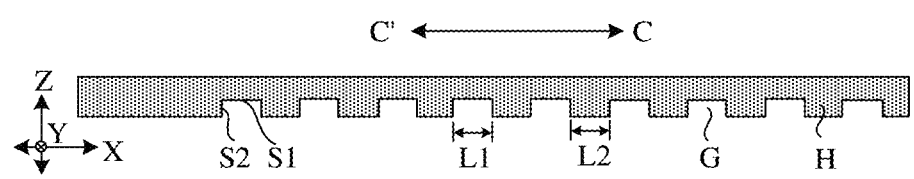
FIG. 7 is a sectional view of the support plate in FIG. 6 in a direction C-C'.
Figure 8:
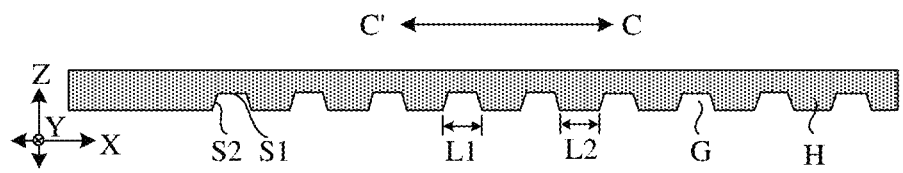
FIG. 8 is another sectional view of the support plate in FIG. 6 in a direction C-C'.

For example, as shown in FIG. 7 and FIG. 8, the groove G includes a bottom surface S1. In the third direction Z, by setting the depth of the groove G to be less than the thickness of the plane part 211, it can be ensured that a spacing exists between the bottom surface S1 and a side surface, of the first part 21, close to the display panel 1. It can be further ensured that the groove G does not penetrate the first part 21, and a side surface, of the first part 21, close to the display panel 1 is a flat surface.

For example, in the third direction Z, the depth of the groove G is half of the thickness of the plane part 211. Definitely, here is only an example of the depth of the groove G, and an actual depth of the groove G is not limited.

It can be understood that the side surface, of the first part 21, close to the display panel 1 is the flat surface. In this way, a spacing between each position of the first part 21 and the display panel 1 may be equal, and then the support plate 2 and the display panel 1 may be bonded together by sealant with an equal thickness. When the display assembly 100 and the electronic device 1000 are impacted, stress concentration between the support plate 2 and the display panel 1 can be prevented. Further, impact resistance of the support plate 2 can be prevented, and reduction of impact resistance of the display assembly 100 and the electronic device 1000 can be prevented.

In addition, as shown in FIG. 6, to prevent the groove part 212 from reducing support strength of the first part 21, in the second direction Y, a first spacing M exists between an edge of the groove part 212 including the plurality of grooves G and an edge of the first part 21 of the support plate 2. That is, in the second direction Y, both ends of the groove G do not extend to an edge, perpendicular to the second direction Y, of the first part 21, and do not penetrate a side wall, of the first part 21 of the support plate 2, parallel to an XZ plane. In this way, the plane part 211 is disposed surround the groove part 212. Therefore, the thickness, of a part of the first part 21, close to an edge will not decrease, thereby preventing reduction of the support strength of the support plate 2.

It should be noted that, in the second direction Y, a first spacing exists between an edge of the groove G and an edge of the first part 21, that is, the plane part 211 exists between the edge of the groove G and the edge of the first part 21. Therefore, reduction of the thickness of an edge of the support plate 2 can be prevented by the plane part 211, and decline of the support strength of the support plate 2 can be further prevented.

Therefore, in the display assembly 100 and the electronic device 1000 provided in this application, the support plate 2 is disposed on the non-light-exit side of the display panel 1, the groove part 212 is disposed in the first part 21 of the support plate 2, the groove G is disposed on a side, away from the display panel 1, of the groove part 212, and a depth of the groove G is limited in a thickness direction of the display panel 1, In this way, the depth of the groove G is less than a thickness of the plane part 211, and the weight of the support plate 2 can be reduced effectively while good impact resistance of the support plate 2 is ensured. Therefore, the weight of the display assembly 100 and the electronic device 1000 can be reduced while good impact resistance of the display assembly 100 and the electronic device 1000 is ensured.

In addition, while the groove part 212 is being disposed in at least one of the plurality of first parts 21 of the support plate 2, the groove part 212 may be selectively disposed in some of the first parts 21. In this way, when the support plate 2 is applied to the display assembly 100 and the electronic device 1000, the weight of a corresponding part (for example, a part located on left and right sides of the electronic device 1000 in FIG. 1) different from the first part 21 may be balanced, and a weight difference from the corresponding part different from the first part 21 may be reduced.

Figure 9:
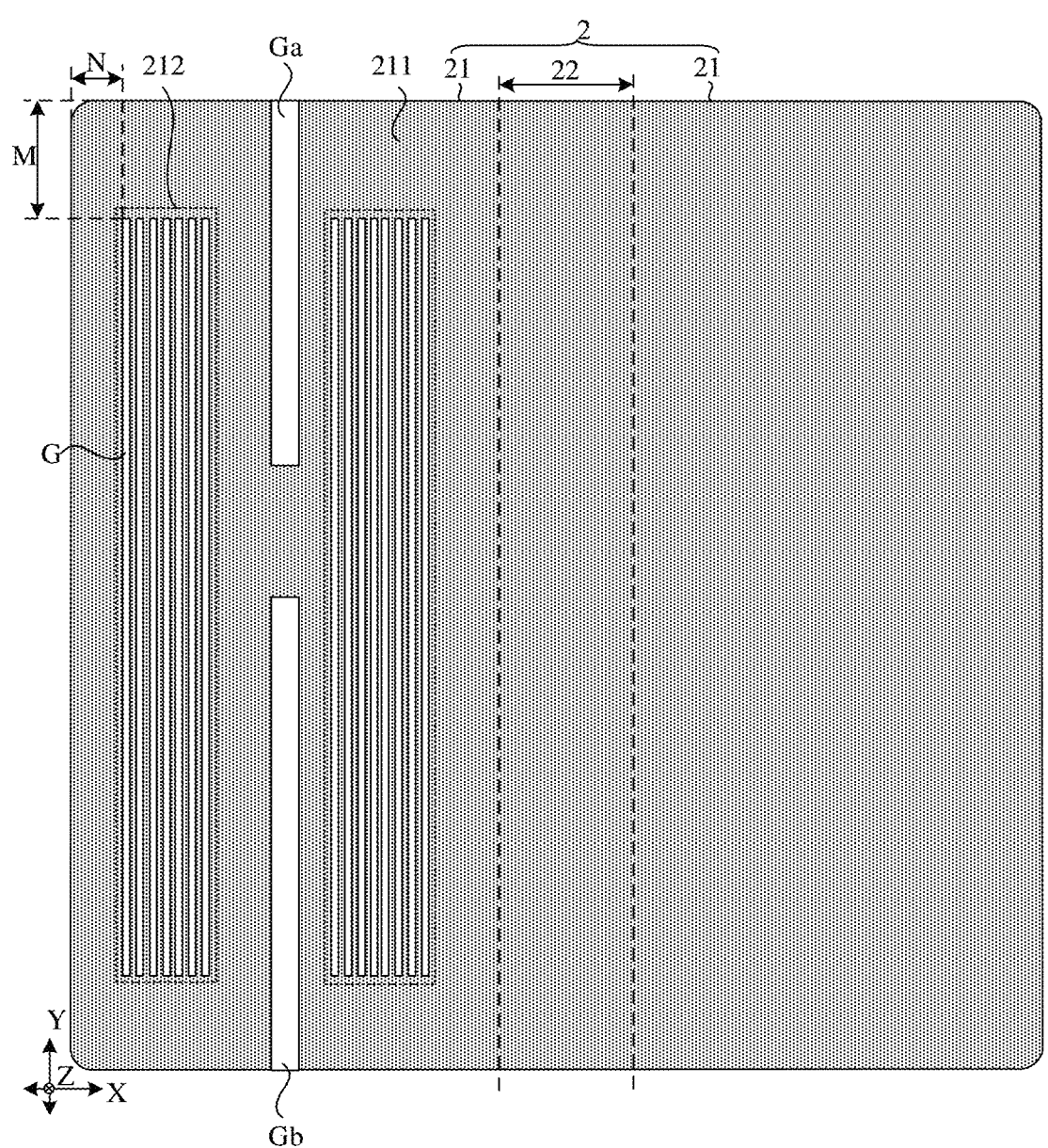
FIG. 9 is still another schematic structural diagram of a support plate according to an embodiment of this application.

In another possible embodiment, as shown in FIG. 9, in a second direction Y, only one edge of a groove G may not penetrate an edge of a first part 21, that is, in the second direction Y, the foregoing first spacing M exists between only one edge of the groove G and the edge of the first part 21. For example, in the second direction Y, two grooves G are arranged at an interval, namely, a first groove Ga and a second groove Gb. The first groove Ga and the second groove Gb respectively extend to adjacent edges of the first part 21 in opposite directions, and respectively penetrate corresponding edges of the first part 21. That is, two adjacent edges of the first groove Ga and the second groove Gb do not penetrate corresponding edges of the first part 21.

In this way, in the second direction Y, although the first groove Ga and the second groove Gb respectively penetrate two edges of the first part 21. However, because the first groove Ga and the second groove Gb are arranged at an interval, that is, a spacing exists with the same thickness as that of a plane part 211 between the first groove Ga and the second groove Gb, the spacing still helps to increase the support strength of the first part 21. That is, in the second direction Y, the groove G does not continuously extend from one side edge to an opposite other side edge. Therefore, the support strength of a first part 21 of the support plate 2 will not be reduced.

In some embodiments, in the second direction Y, the first spacing M between an edge of the groove G and an edge of the first part 21, M≥20.2 mm. For example, the first spacing M may be 0.5 mm, 1 mm, 2 mm, 3 mm, 4 mm, 5 mm, 6 mm, 7 mm, 8 mm, 9 mm, 10 mm, and the like. In addition, the first spacing M may be equal or unequal in a first direction X. This is not specifically limited in this application.

In some embodiments, in the first direction X, a second spacing N exists between an edge of the groove G and an edge of the first part 21, where N≥0.2 mm. For example, the second spacing N may be 0.5 mm, 1 mm, 2 mm, 3 mm, 4 mm, 5 mm, 6 mm, 7 mm, 8 mm, 9 mm, 10 mm, and the like. In addition, the second spacing N may be equal or unequal in the second direction Y. This is not specifically limited in this application.

It can be understood that the first spacing M and second spacing N each refers to a minimum spacing between an edge of the groove G and an edge of the first part 21. For example, when an edge of the groove G is a curve, a spacing between a point of the edge closest to an edge of the first part 21 and an edge of the first part 21 shall prevail.

In addition, because the first spacing M and the second spacing N exist in the first part 21, back adhesive can be easily pasted to the support plate 2. Therefore, the support plate 2 may be bonded to and fixed to another component. For example, when the first spacing M and both the second spacing N are greater than or equal to 1 mm, when the back adhesive is pasted to the support plate 2, a bonding area is increased, which helps to increase the bonding strength, thereby increasing the structural reliability of a device.

In addition, in a plane parallel to the first part 21 of the support plate 2, that is, in an XY plane, a ratio of a sum of coverage areas of a plurality of grooves G on the first part 21 to an area of the first part 21 is less than or equal to 4:5. For example, the plurality of grooves G can occupy 80% of the area of the first part 21 at most. In this case, a region, where no groove G is disposed, on the first part 21 occupies 20% of the area of the first part 21. In addition, the plane part 211 is disposed surround a groove part 212.

In this way, the weight of the support plate 2 can be reduced to the maximum extent. In addition, because spacings (including the first spacing and the second spacing) exist between edges of the groove G and edges of the first part 21 (including the edge in the first direction X and the edge in the second direction Y), that is, the plane part 211 forms an annular structure surround the plurality of grooves G, the support strength of the support plate 2 can be ensured. Therefore, while the weight of the electronic device 1000 is reduced, the display assembly 100 and the electronic device 1000 have good impact resistance.

It should be noted that a coverage area of the groove G on the first part 21 refers to an area occupied by a notch of the groove G on a surface of the first part 21 in a third direction Z. For example, when the area of the notch of the groove G is greater than an area of a groove bottom, a coverage area of the groove G on the first part 21 refers to an area of a vertical projection of the notch of the groove G on the first part 21. In addition, a sum of areas of the plurality of grooves G may occupy 75%, 70%, 65%, 60%, 55%, 50%, 45%, 40%, and the like of the area of the first part 21, which is not specifically limited in this application.

In some embodiments, as shown in FIG. 7 and FIG. 8, the groove G further includes a side surface S2 connected to the bottom surface S1. An angle exists between the bottom surface S1 and the side surface S2, and the angle is greater than or equal to 90°.

In some examples, as shown in FIG. 7, the angle between the bottom surface S1 and the side surface S2 is equal to 90°. In this case, a sectional shape of the groove G may be a rectangle or square.

For example, in this application, solution (or liquid medicine) corresponding to a material of the support plate 2 may be used, to etch a specific position of the first part 21, to obtain the groove part 212 including the plurality of grooves G. The solution (or liquid medicine) may etch the first part 21 in the third direction Z in the same amount. Therefore, the angle between the bottom surface S1 and the side surface S2 in the formed groove G is equal to 90°. This helps preparation and formation of the groove G.

In some other examples, as shown in FIG. 8, the angle between the bottom surface S1 and the side surface S2 is greater than 90°. In this case, a sectional shape of the groove G may be trapezoidal.

In this way, when the first part 21 of the support plate 2 is impacted, the side surface S2 of the groove G can buffer transmission of an impact force, preventing stress concentration at a junction of the bottom surface S1 and the side surface S2, and helping to prolong service life of the support plate 2.

In some examples, a plurality of grooves G in the groove part 212 may be arranged in an array.

For example, the plurality of grooves G may be arranged in at least one row in the first direction X and arranged in at least one row in the second direction Y.

For example, as shown in FIG. 6, the plurality of grooves G in the groove part 212 are arranged in a row in the first direction X and arranged in a plurality of rows in the second direction Y.

Figure 12:
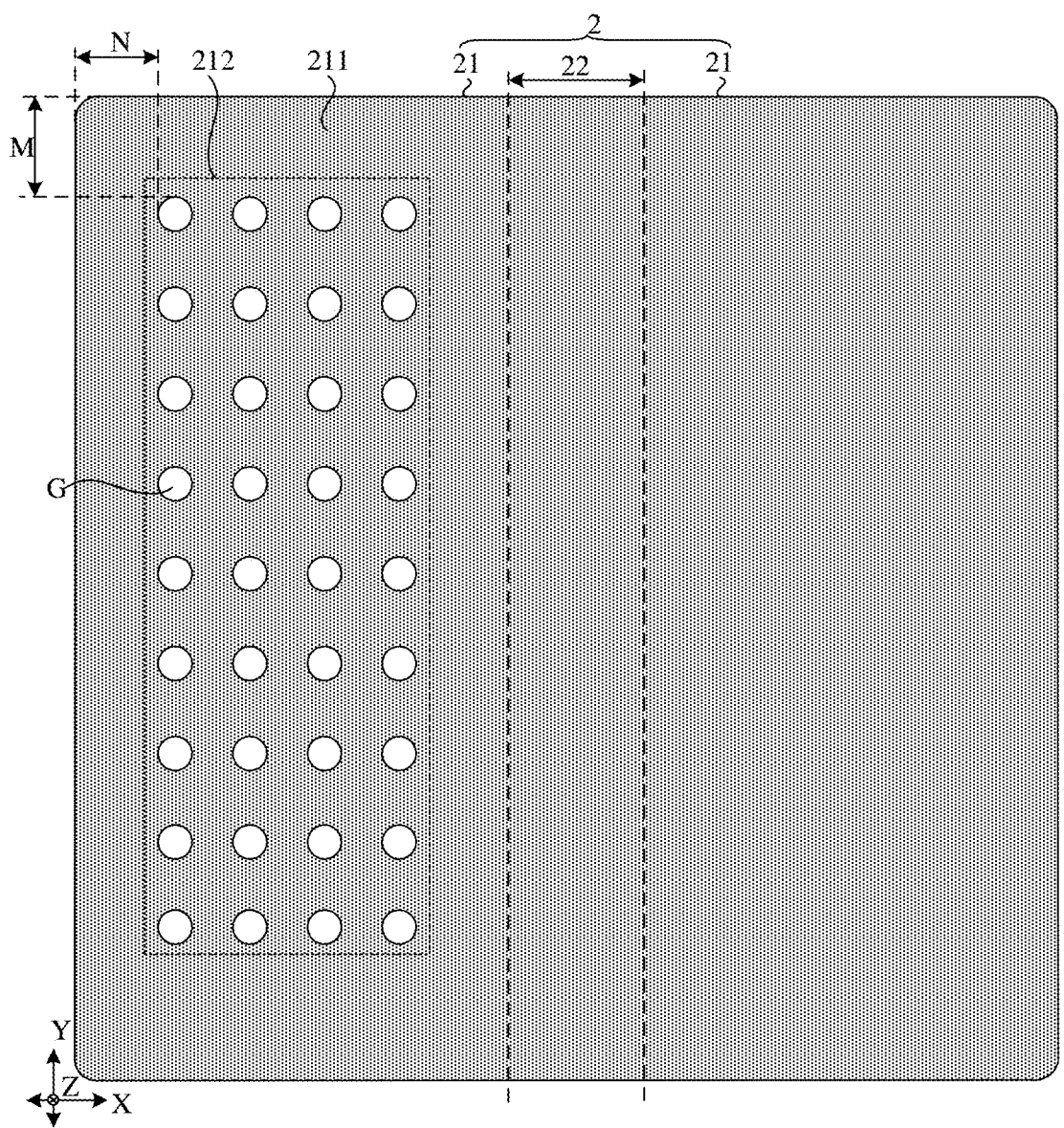
FIG. 12 is a further schematic structural diagram of a support plate according to an embodiment of this application.
Figure 13:
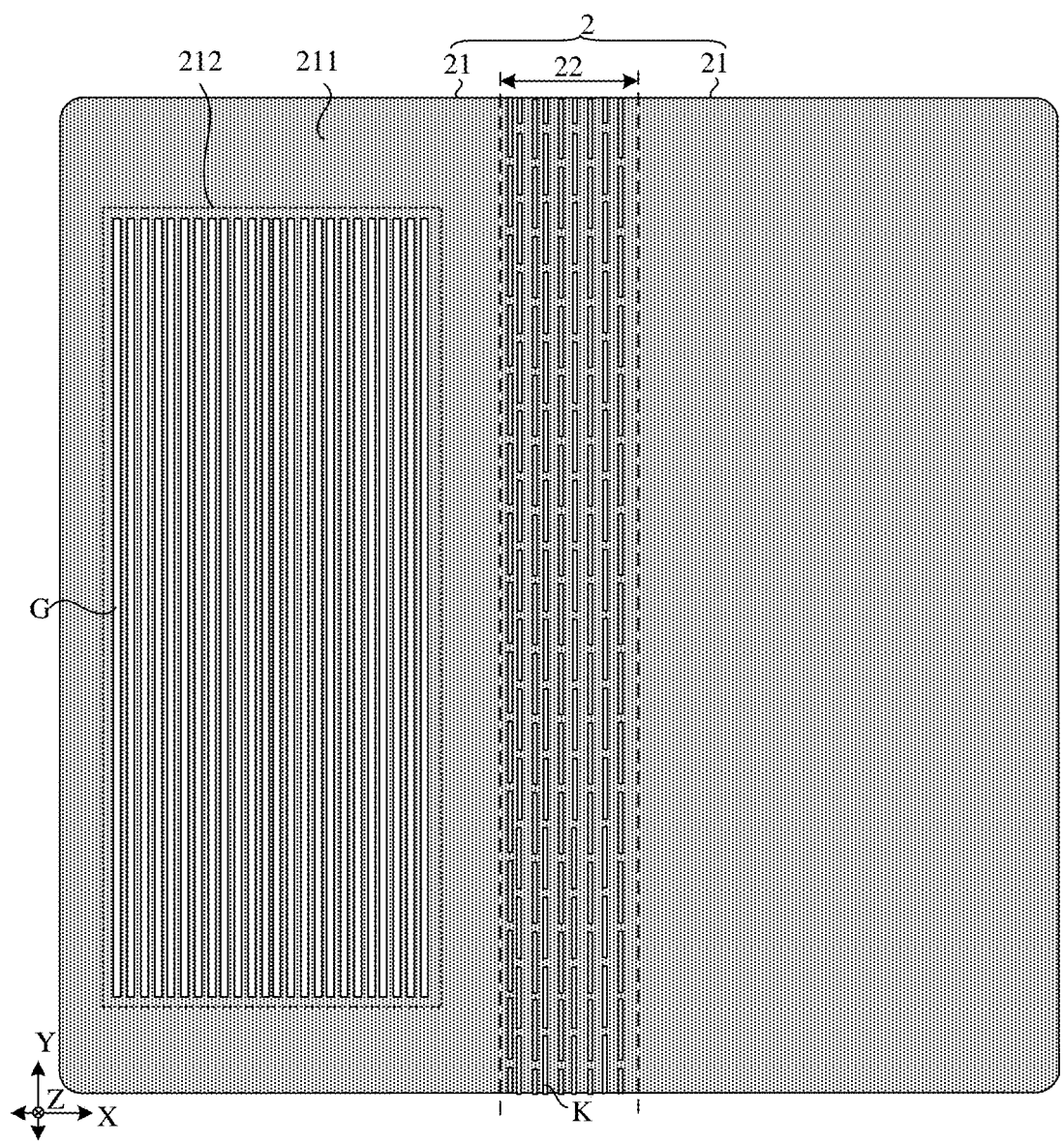
FIG. 13 is a still further schematic structural diagram of a support plate according to an embodiment of this application.

For another example, as shown in FIG. 12, a plurality of grooves G in a groove part 212 are arranged in a plurality of rows in a first direction X and arranged in a plurality of rows in a second direction Y.

The plurality of grooves G are arranged in an array. Accordingly, arrangement regularity of the plurality of grooves G may be increased, and a difficulty in preparing and forming the grooves G may be reduced.

There are many kinds of shapes of orthogonal projections of the grooves G on a plane where the first part 21 is located, which can be set based on actual needs.

Figure 11:
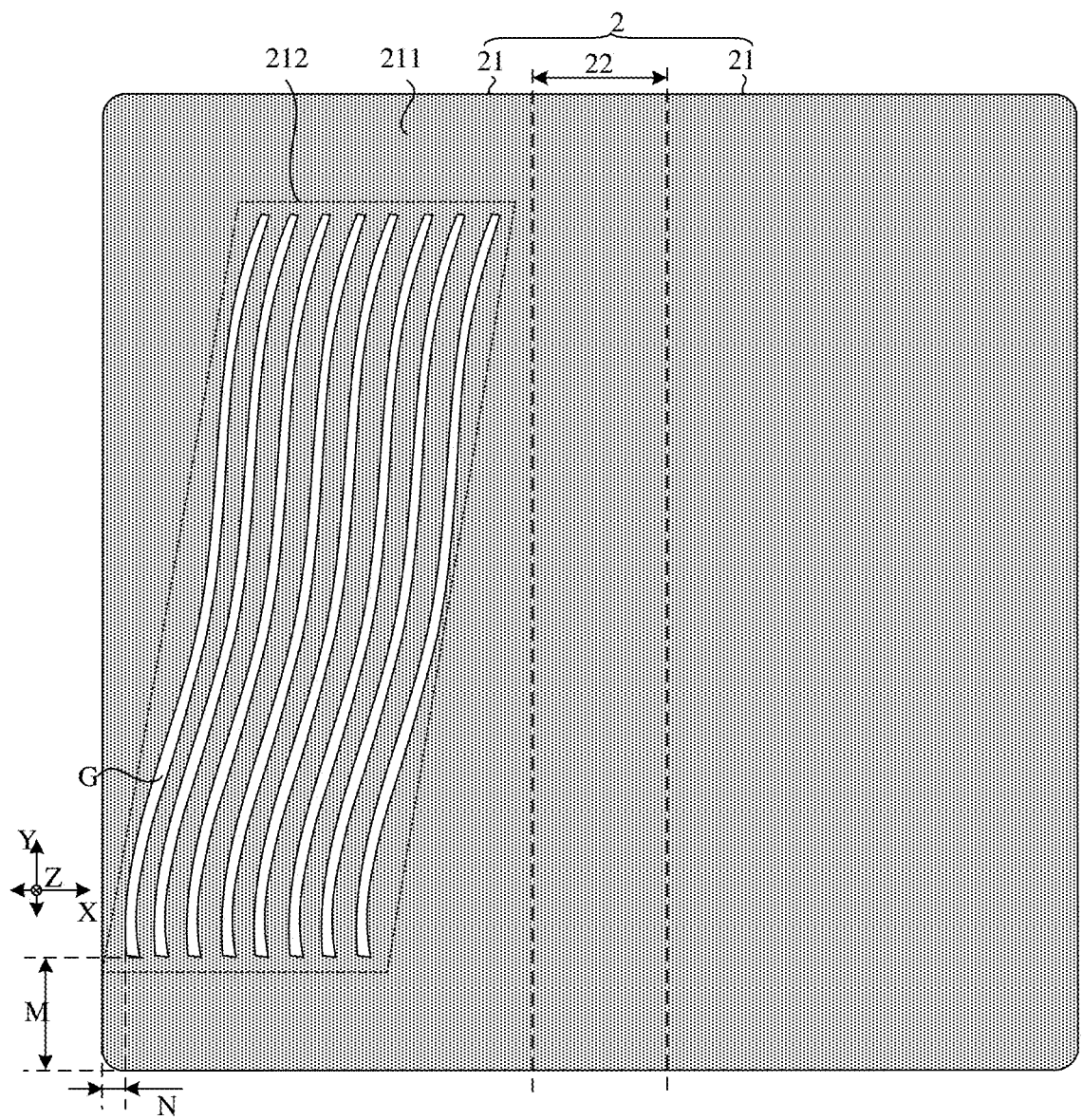
FIG. 11 is still yet another schematic structural diagram of a support plate according to an embodiment of this application.

In some examples, a shape of the orthogonal projection of the grooves G on the plane where the first part 21 is located includes a strip shape (as shown in FIG. 6 and FIG. 10), a curve (as shown in FIG. 11), a circle (as shown in FIG. 12), an ellipse, or a square.

For example, as shown in FIG. 6, FIG. 10, and FIG. 11, in a case that the shape of the orthogonal projection of the grooves G on the plane where the first part 21 is located is a strip shape or curve, a length direction (or an extension direction) and arrangement of the grooves G may be the same or similar.

For example, in a vertical direction of the length direction of the grooves G, the plurality of grooves G in the groove part 212 are arranged in parallel and at intervals.

Optionally, as shown in FIG. 6 and FIG. 10, the shape of the orthogonal projection of the grooves G on the plane where the first part 21 is located is a strip shape. A length direction of each groove G is the second direction Y, and a vertical direction of the length direction of each groove G is the first direction X. The plurality of grooves G in the groove part 212 are arranged in parallel and at intervals in the first direction X. Definitely, in this example, the length direction of the groove G may also have an angle with the second direction Y, and a range of the angle is 0°-90°.

Optionally, as shown in FIG. 6 and FIG. 10, the shape of the orthogonal projection of the grooves G on the plane where the first part 21 is located is a curve. The length direction of each groove G has an angle with the first direction X or the second direction Y. Correspondingly, the vertical direction of the length direction of the groove G also has an angle with the first direction X or the second direction Y. The plurality of grooves G in the groove part 212 are arranged in parallel and at intervals in the first direction X. Definitely, the length direction of the groove G in this example may also be the first direction X or the second direction Y.

By setting the grooves G in the foregoing arrangement, a part (that is, a separation sub-part H) of the groove part 212 except the grooves G may be in a plurality of strip shapes, and ends of the plurality of strip shapes are connected to each other. Therefore, support is provided by the separation sub-part H between two adjacent grooves G in the groove part 212, to ensure impact resistance of the display assembly 100 and the electronic device 1000, and the arrangement regularity of the grooves G can be increased. Accordingly, relatively many grooves G can be disposed in the groove part 212, an area ratio of the grooves G in the groove part 212 can be increased, the weight of the support plate 2 can be reduced effectively, and the weight of the display assembly 100 and the electronic device 1000 can be reduced effectively.

For example, in a case that the shape of the orthogonal projection of the grooves G on the plane where the first part 21 is located is a circle, an ellipse, or a square, arrangement of the grooves G may be the same or similar.

For example, the shape of the orthogonal projection of the grooves G on the plane where the first part 21 is located is a circle. As shown in FIG. 12, a plurality of grooves G in a groove part 212 may be arranged in an array, that is, the plurality of grooves G may be arranged in a plurality of columns in a first direction X and arranged in a plurality of rows in a second direction Y.

By setting the grooves G in the foregoing arrangement, a part (that is, a separation sub-part H) of the groove part 212 except the grooves G may be in a grid shape. Accordingly, not only continuity of the separation sub-part H between any two adjacent grooves G in the groove part 212 can be increased, the support effect of the support plate 2 and impact resistance of the display assembly 100 and the electronic device 1000 can be ensured, but also arrangement regularity of the grooves G can be increased. Therefore, relatively many grooves G can be disposed in the groove part 212, and the weight of the support plate 2 and the weight of the display assembly 100 and the electronic device 1000 can be reduced effectively.

In some embodiments, as shown in FIG. 7 and FIG. 8, a ratio of a spacing L2 between two adjacent grooves G to a dimension L1 of a groove G in a set direction is greater than or equal to 2:3. The set direction is a direction parallel to the plane where the first part 21 is located. In other words, the set direction is parallel to the plane where the first part 21 is located, that is, the set direction is parallel to a YX plane.

It should be noted that the spacing L2 between two adjacent grooves G refers to a spacing between two adjacent side surfaces S2 of two adjacent grooves G. The set direction and the dimension L1 of the groove G in the set direction are related to a shape of the orthogonal projection of the grooves G on the plane where the first part 21 is located. For example, the shape of the orthogonal projection of the grooves G on the plane where the first part 21 is located is a strip shape or curve, the set direction is a vertical direction of the length direction of the groove G, the dimension L1 of the groove G in the set direction is a spacing between two opposite side surfaces of the groove G in a vertical direction of the length direction of the groove G. For another example, the shape of the orthogonal projection of the grooves G on the plane where the first part 21 is located is a circle, an ellipse, or a square, the set direction is a diameter direction of the circle, a long axis direction of the ellipse, or a diagonal direction of the square, and the dimension L1 of the groove G in the set direction is a diameter value of the circle, a long axis value of the ellipse, or a diagonal length value of the square.

In some examples, the ratio of a spacing L2 between two adjacent grooves G to a dimension L1 of the groove G in a set direction is may be 2:3, 1:1, 4:3, 3:2, or the like.

In a case that the ratio of a spacing L2 between two adjacent grooves G to a dimension L1 of the groove G in a set direction is relatively small, the spacing L2 between two adjacent grooves G is relatively small. In this case, a span between two adjacent grooves G is relatively small, and when the support plate 2 or the display assembly 100 is impacted, the separation sub-part H in the groove part 212 between any two adjacent grooves G may form a bridge-pier-like support.

In a case that the ratio of a spacing L2 between two adjacent grooves G to a dimension L1 of the groove G in a set direction is relatively big, the spacing L2 between two adjacent grooves G is relatively big. In this case, the span between two adjacent grooves G is relatively big, and when the support plate 2 or the display assembly 100 is impacted, it can be ensured that the separation sub-part H in the groove part 212 between any two adjacent grooves G may provide relatively good support.

For example, a value range of the dimension L1 of the groove G in the set direction is 0.8 mm-1.2 mm. The dimension L1 of the groove G in the set direction may be 0.8 mm, 0.9 mm, 1 mm, 1.1 mm, 1.2 mm, or the like. A value range of the spacing L2 between two adjacent grooves G is 0.8 mm-1.2 mm. The spacing L2 between two adjacent grooves G may be 0.8 mm, 0.9 mm, 1 mm, 1.1 mm, 1.2 mm, or the like.

In some examples, the spacing L2 between two adjacent grooves G is greater than or equal to the dimension L1 of the groove G in the set direction. That is, the ratio of a spacing L2 between two adjacent grooves G to a dimension L1 of the groove G in a set direction is greater than or equal to 1.

For example, the value range of dimension L1 of the groove G in the set direction is 0.8 mm-1.2 mm, and the value range of the spacing L2 between two adjacent grooves G is 0.8 mm-1.2 mm. In the same value range, a value of the spacing L2 between two adjacent grooves G is greater than or equal to a value of the dimension L1 of the groove G in the set direction.

In this way, a ratio of an area of the separation sub-part H located between two adjacent grooves G in the first part 21 can be increased, and a support effect of the support plate 2 can be ensured.

In some examples, as shown in FIG. 6 and FIG. 10, at least some of the plurality of grooves G in the groove part 212 are arranged at an equal interval.

That is, the plurality of grooves G may be arranged at an equal interval. Alternatively, some of the plurality of grooves G may be arranged at an equal interval, and the others may be arranged at an unequal interval. For example, in FIG. 10, in the first direction, a spacing between at least two grooves G is not equal to a spacing between others of the grooves G.

In some embodiments, as shown in FIG. 17 to FIG. 22, in a first part 21 provided with a groove G, a plane part 211 includes at least one adsorption sub-part 213. The at least one adsorption sub-part 213 and a plurality of grooves G in a groove part 212 are staggered.

For example, the first part 21 provided with a groove G may include one, two, three, four, or more adsorption sub-parts 213. The groove G does not penetrate or extend to the adsorption sub-part 213, and an orthogonal projection of the grooves G on a plane where a support plate 2 is located does not overlap an orthogonal projection of the adsorption sub-part 213 on the plane where the support plate 2 is located.

Figure 18:
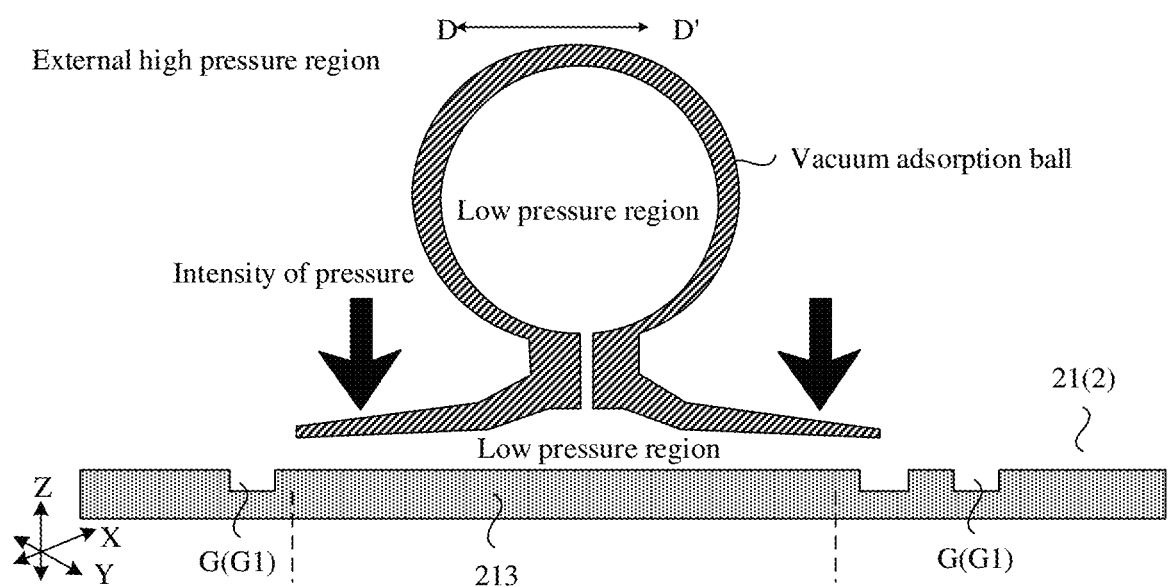
FIG. 18 is a sectional view of a structure and vacuum adsorption ball shown in FIG. 17 tin a direction D-D'.
Figure 21:
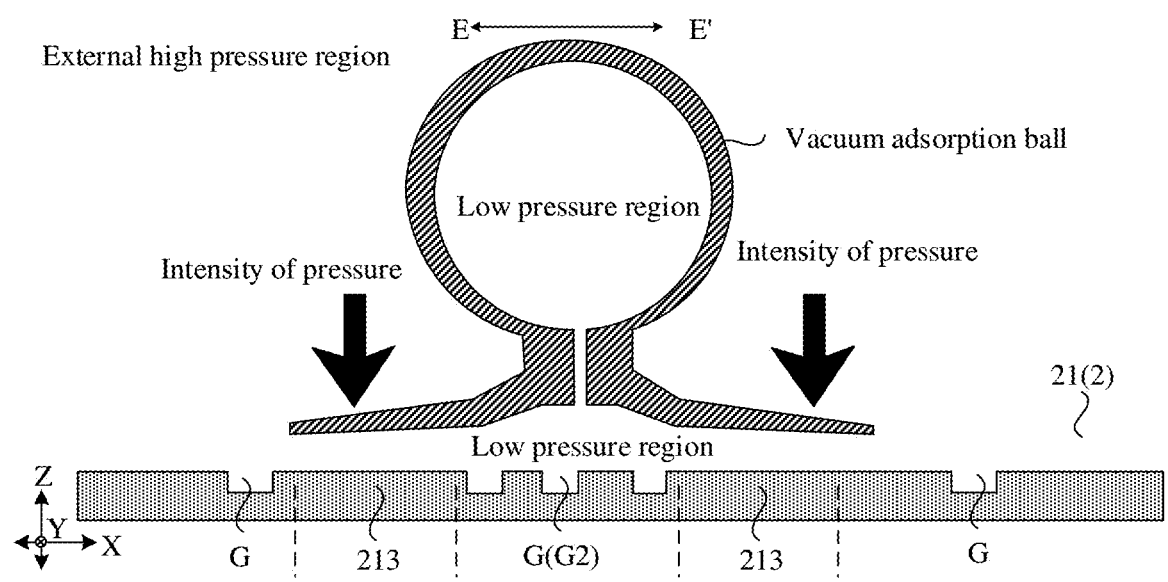
FIG. 21 is a sectional view of a structure and vacuum adsorption ball shown in FIG. 20 in a direction E-E'.

In some examples, as shown in FIG. 18 and FIG. 21, a side surface, away from a display panel 1, of the adsorption sub-part 213 is a first surface. The first surface is a continuous plane. The "continuous" means that the first surface is not disconnected. The "plane" means that the first surface has relatively great flatness basically without unevenness. FIG. 18 and FIG. 21 show the first part 21 of the support plate 2, but does not show the display panel 1. It can be known with reference to FIG. 4 and FIG. 5 that the display panel 1 is located below the support plate 2.

This helps to ensure that the side surface, away from the display panel 1, of the adsorption sub-part 213 is a relatively flat surface.

It should be noted that during assembly of the display assembly 100, the display panel 1, support plate 2, protective cover plate 4, flexible printed circuit board 5, COP outlet line or chip on film 6, and adhesive 7 are first assembled to form a module, and then the module is assembled with the middle frame 3, front cover 200, and the like. During transportation of the module, to prevent a device 51 in the flexible printed circuit board 5 from being damaged by bumping or a production line from being reversedly assembled, the module will be placed in an accommodating housing (or protective housing), with the protective cover plate 4 facing down and the flexible printed circuit board 5 facing up. During assembly of the module with the middle frame 3, the front cover 200, and the like, the module needs to be taken out the accommodating housing.

Figure 23:
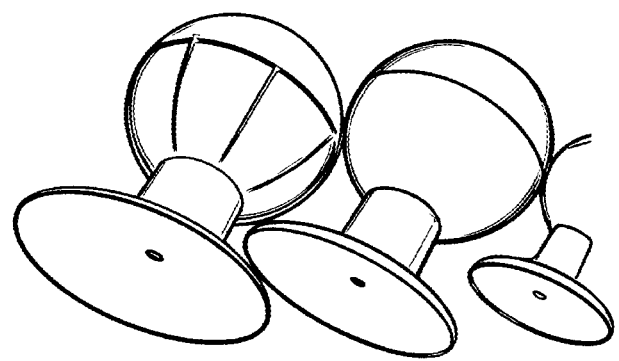
FIG. 23 is a schematic structural diagram of a vacuum adsorption ball according to an embodiment of this application.

In this application, the module may be taken out by a vacuum adsorption ball (as shown in FIG. 23). For example, an adsorption ball head of the vacuum adsorption ball may be pinched, to remove air in the adsorption ball head, and then an adsorption ball chuck of the vacuum adsorption ball is placed at a position of the adsorption sub-part 213, and then the adsorption ball head is loosened. A low-pressure region is formed inside the adsorption ball head, and an external high-pressure region is formed outside the adsorption ball head. A pressure difference between the inside and outside of the adsorption ball head enables an intensity of pressure between the adsorption ball chuck and a first surface of the adsorption sub-part 213, so that the adsorption ball chuck and the first surface of the adsorption sub-part 213 are attached together. By picking up the vacuum adsorption ball, the module may be taken out of the accommodating housing. In this way, picking (or withdrawing) or touching the module by hand of an employee can be prevented, to reduce a damage rate of the module.

In addition, in this application, the adsorption sub-part 213 and the groove G are staggered, and the first surface of the adsorption sub-part 213 is set as a continuous plane. Therefore, air leakage between the adsorption ball chuck and the first surface of the adsorption sub-part 213 can be prevented, and it can be prevented that the module cannot be taken out of the accommodating housing through adsorption by the vacuum adsorption ball.

It can be understood that while the module is being picked up, the vacuum adsorption ball may be arranged on each adsorption sub-part 213. In a case that there are a quantity of the adsorption sub-parts 213, a plurality of vacuum adsorption balls may be configured to adsorb and pick up the module. This helps to increase a success rate of adsorption and pickup.

In some examples, the adsorption sub-part 213 does not overlap the plurality of grooves G in the groove part 212. In addition or alternatively, a spacing exists between the adsorption sub-part 213 and the plurality of grooves G in the groove part 212.

That is, the adsorption sub-part 213 does not contact its adjacent groove G, and the groove G does not extend into the adsorption sub-part 213.

This helps to ensure that the adsorption sub-part 213 and the plurality of grooves G in the groove part 212 are staggered, and that the first surface of the adsorption sub-part 213 is a continuous plane.

In some examples, as shown in FIG. 18 and FIG. 21, a part in the plane part 211 except the adsorption sub-part 213 is a set part. A side surface, away from the display panel 1, of the set part is a second surface, and the second surface is flush with the first surface. In a thickness direction of the display panel 1, that is, a third direction Z, a thickness of the adsorption sub-part 213 is equal to a thickness of the set part.

Because the first surface of the adsorption sub-part 213 is flush with the second surface of the set part, and the thickness of the adsorption sub-part 213 is equal to that of the set part, a side surface of the adsorption sub-part 213 close to the display panel 1 is also flush with a side surface of the set part close to the display panel 1. In this way, the vacuum adsorption ball is configured to pick up the module, to reduce the damage rate of the module, and formation of a difference in level between the side surface, of the adsorption sub-part 213, close to the display panel 1 and the side surface, of the set part, close to the display panel 1 can be prevented, and an adverse effect on structural stability of the display panel 1 can be prevented.

In some examples, as shown in FIG. 18 and FIG. 21, a separation sub-part H, in the groove part 212, located between two adjacent grooves G and the adsorption sub-part 213 are connected to each other and have an integral structure.

That is, while the groove part 212 (that is, the groove G) is being formed on the side, away from the display panel 1, of the first part 21, a region where the adsorption sub-part is to be formed may be planned but is not etched, and only a region other than the region is etched, so that the adsorption sub-part 213 may be naturally formed. This not only helps to reduce a difficulty in forming the adsorption sub-part 213, but also reduce the amount of solution for forming the groove G through etching, thereby reducing costs.

In some examples, as shown in FIG. 17, FIG. 19, FIG. 20, and FIG. 22, a shape of a connecting line of ends, close to the adsorption sub-part 213, of a plurality of grooves G in the groove part 212 is complementary to a shape of a boundary, close to the plurality of grooves G, of the adsorption sub-part 213.

In this way, a spacing between the connecting line of ends, close to the adsorption sub-part 213, of the plurality of grooves G in the groove part 212 and the boundary, close to the plurality of grooves G, of the adsorption sub-part 213 can be reduced, which can not only enable an area of the adsorption sub-part 213 to correspond to the adsorption ball chuck, to ensure that the vacuum adsorption ball can successfully adsorb and pick up the module, but also enable the groove part 212 to have a relatively great area ratio in the first part 21, reducing the weight of the support plate 2 and the weight of the display assembly 100 and the electronic device.

Figure 17:
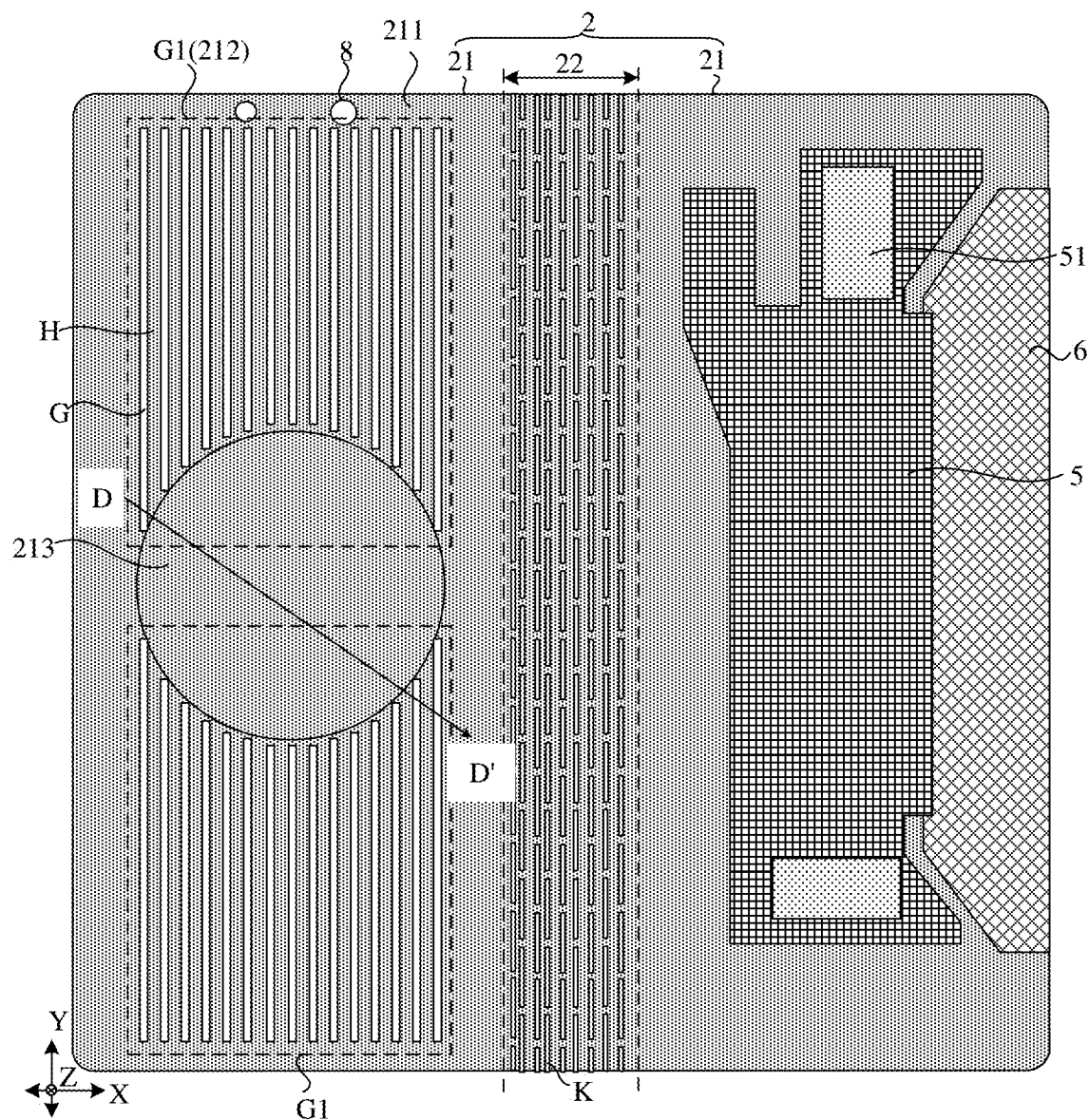
FIG. 17 is yet another bottom view of a support plate, flexible printed circuit board, and COP outlet line or chip on film in FIG. 5.
Figure 19:
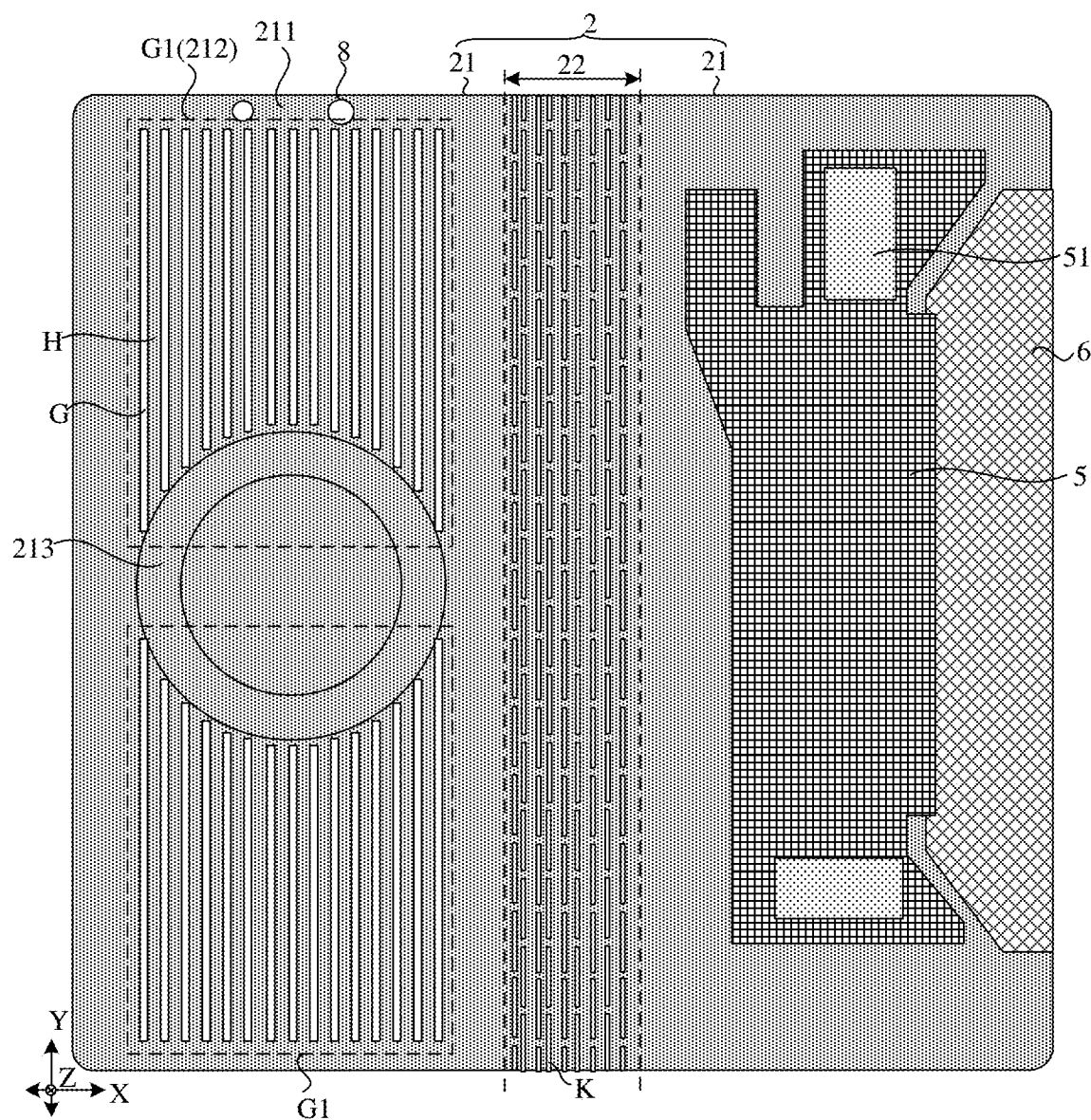
FIG. 19 is still yet another bottom view of a support plate, flexible printed circuit board, and COP outlet line or chip on film in FIG. 5.
Figure 20:
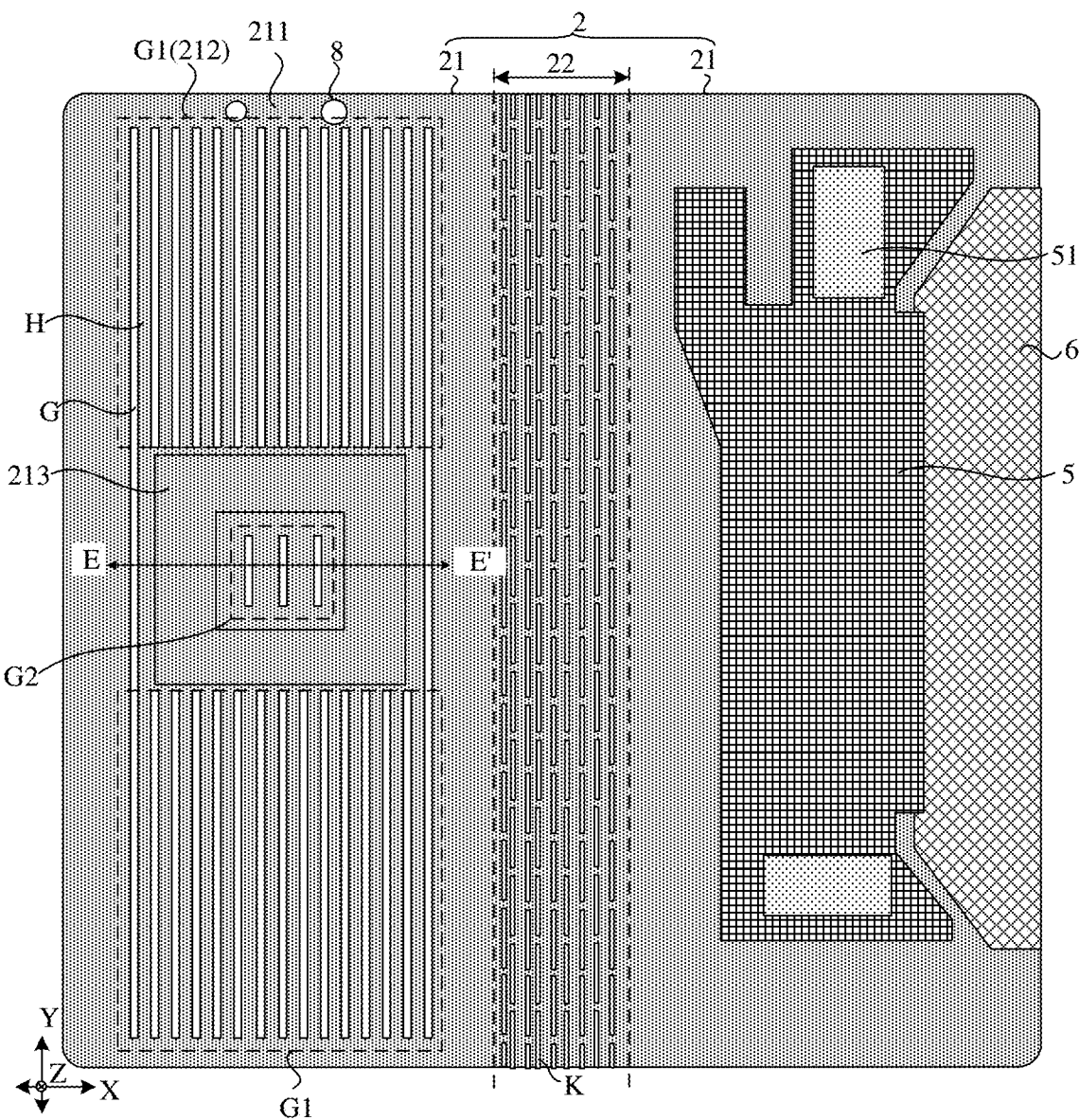
FIG. 20 is a further bottom view of a support plate, flexible printed circuit board, and COP outlet line or chip on film in FIG. 5.
Figure 22:
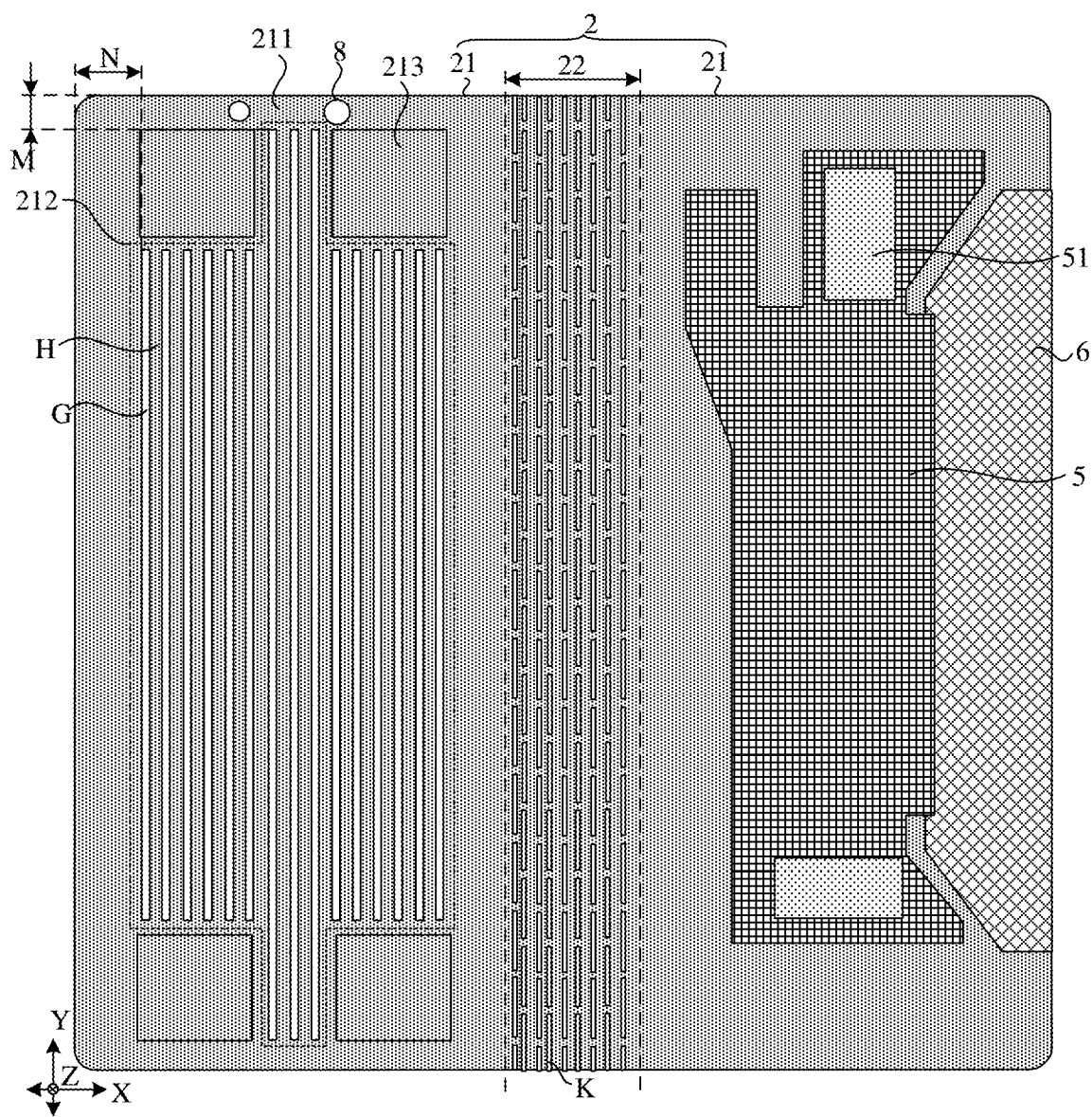
FIG. 22 is a still further bottom view of a support plate, flexible printed circuit board, and COP outlet line or chip on film in FIG. 5.

In some examples, as shown in FIG. 17, FIG. 19, FIG. 20, and FIG. 22, a shape of the adsorption sub-part 213 includes a circle (as shown in FIG. 17), a square (as shown in FIG. 22), a ring (as shown in FIG. 19), or a frame (as shown in FIG. 20).

In this way, while the vacuum adsorption ball is configured to pick up the module, it can be ensured that intensity of pressure may be generated between each position of the adsorption sub-part 213 and the adsorption ball chuck, to prevent air leakage.

It can be understood that the shape of the adsorption sub-part 213 is not limited to the foregoing example, but may be flexibly set based on a size, dimension, or shape of the vacuum adsorption ball.

In some embodiments, as shown in FIG. 20, the adsorption sub-part 213 surrounds at least one groove G.

For example, a shape of the groove G is a ring or frame. In the plurality of grooves G of the groove part 212, one groove G, two grooves G, or even all grooves G may be dispose inside the adsorption sub-part 213 and surrounded by the adsorption sub-part 213.

In addition, a quantity of grooves G surrounded by the adsorption sub-part 213 may be selected and disposed based on actual needs, provided that adsorption and pickup of the module by the vacuum adsorption ball is not affected.

In some examples, as shown in FIG. 17 and FIG. 19, the groove part 213 includes a first groove group G1, and a quantity of the first groove groups G1 may be at least two. Each first groove group G1 includes at least two grooves G.

The quantity of the first groove groups G1 may be two, three, or more. A quantity of grooves G included in each first groove group G1 may be two, three, or more. For example, at least two of the first groove groups G1 may be sequentially arranged in a second direction Y. Definitely, the at least two first grooves G1 may also be arranged in another manner.

The adsorption sub-part 213 is located between the at least two first groove groups G1. For example, in the second direction Y, the at least two first groove groups G1 are arranged in a row, and the adsorption sub-part 213 is located between two of the first groove groups G. In this case, the shape of the adsorption sub-part 213 may be a circle, a square, a ring, or a frame.

This helps to dispose the adsorption sub-part 213 at a position close to a center of the support plate 2 or the module. When the module is picked up by the vacuum adsorption ball, it can be prevented that the module is inclined to a great extent.

In some examples, as shown in FIG. 20, the adsorption sub-part 213 further surrounds a second groove group G2, and the second groove group G2 includes at least two grooves G. A quantity of grooves G included in each second groove group G2 may be two, three, or more.

For example, the second groove group G2 is located between the at least two first groove groups G1. For example, the two first groove groups G1 are sequentially arranged in the second direction Y, and the second groove group G2 may be located between two of the first groove groups G1 and arranged in a row together with the at least two first groove groups G1.

As shown in FIG. 20, the adsorption sub-part 213 surrounds the second groove group G2. In this case, the shape of the adsorption sub-part 213 may be a ring or a frame.

A quantity of the second groove groups G2 may be, for example, the same as that of the adsorption sub-parts 213, so that each adsorption sub-part 213 may surround one second groove group G2.

By enabling the adsorption sub-part 213 to surround the second groove group G2, while the module is adsorbed and picked up by the vacuum adsorption ball, the weight of the support plate 2 can be further reduced, and the weight of the display assembly 100 and the electronic device can be reduced.

It should be noted that, as shown in FIG. 17, an orthogonal projection of the flexible printed circuit board 5 in the display assembly 100 on the support plate 2 and at least one adsorption sub-part 213 are staggered. That is, the orthogonal projection and the at least one adsorption sub-part 213 do not overlap.

In this way, it can be prevented that the flexible printed circuit board 5 from blocking the adsorption sub-part 213, and an adverse impact on adsorption and pickup of the module by the vacuum adsorption ball can be further prevented.

In some examples, as shown in FIG. 17, a plurality of openings K are disposed in a second part 22 of the support plate 2. The plurality of openings K may penetrate the support plate 2. In this way, while the electronic device 100 is folded to cause the second part 22 of the support plate 2 to be bent, the plurality of openings K may be configured to reduce stress concentration in the second part 22. In addition, disposing of the plurality of openings K also helps to reduce the weight of the support plate 2 and the weight of the display assembly 100 and the electronic device.

In the description of this specification, specific features, structures, materials, or characteristics may be combined in an appropriate manner in any one or more embodiments or examples.

The foregoing embodiments are merely intended for describing the technical solutions of this application, but not for limiting this application. Although this application is described in detail with reference to the foregoing embodiments, persons of ordinary skill in the art is to understand that they may still make modifications to the technical solutions described in the foregoing embodiments or make equivalent replacements to some technical features thereof, without departing from the spirit and scope of the technical solutions of the embodiments of this application.

What is claimed is:

1. A display assembly, comprising:
   a display panel; and
   a support plate, disposed on a non-light-exit side of the display panel, wherein the support plate comprises at least one first part, and the at least one first part is flat;
   wherein the at least one first part comprises a plane part and a groove part connected to each other; and
   a plurality of grooves extend in a side of the groove part that faces away from the display panel, and a depth of each groove of the plurality of grooves is less than a thickness of the plane part in a thickness direction of the display panel;
   wherein the plane part comprises at least one adsorption sub-part, and the at least one adsorption sub-part and the plurality of grooves are staggered, and a side surface, that faces away from the display panel, of the at least one adsorption sub-part is a first surface, and the first surface is a continuous plane; and
   wherein a part, in the plane part, other than the at least one adsorption sub-part is a set part, and a side surface, that faces away from the display panel, of the set part is a second surface, the first surface is flush with the second surface, and in the thickness direction of the display panel, a thickness of the adsorption sub-part is equal to a thickness of the set part.

2. The display assembly according to claim 1, wherein the at least one adsorption sub-part skips overlapping the plurality of grooves; and/or
   a spacing exists between the at least one adsorption sub-part and the plurality of grooves.

3. The display assembly according to claim 2, wherein a shape of the at least one adsorption sub-part comprises a circle, a square, a ring, or a frame.

4. The display assembly according to claim 3, wherein the at least one adsorption sub-part surrounds at least one groove of the plurality of grooves.

5. The display assembly according to claim 4, wherein a shape of a connecting line of ends, that is closest to the at least one adsorption sub-part, of the plurality of grooves, is complementary to a shape of a boundary, that is closest to the plurality of grooves, of the at least one adsorption sub-part.

6. The display assembly according to claim 5, wherein the groove part comprises at least two first groove groups, each first groove group comprises at least two grooves of the plurality of grooves, and the at least one adsorption sub-part is located between the at least two first groove groups.

7. The display assembly according to claim 6, wherein the groove part further comprises a second groove group, the second groove group comprises another at least two grooves of the plurality of grooves, and the second groove group is located between the at least two first groove groups; and
at least one the adsorption sub-part surrounds the second groove group.

8. The display assembly according to claim 7, wherein the groove part comprises a separation sub-part between two adjacent grooves, and the separation sub-part and the at least one adsorption sub-part are connected to each other and have an integral structure.

9. The display assembly according to claim 8, wherein the display assembly further comprises:
a protective cover plate disposed on a side, that faces away from the support plate, of the display panel;
a middle frame disposed on a side, that faces away from the display panel, of the support plate; and
a flexible printed circuit board bound to the display panel, wherein the flexible printed circuit board is located between the support plate and the middle frame; and
wherein an orthogonal projection of the flexible printed circuit board on the support plate and at least one adsorption sub-part are staggered.

10. The display assembly according to claim 9, wherein a ratio of a spacing between two adjacent grooves to a dimension of at least one groove in a set direction is greater than or equal to 2:3; and the set direction is a direction parallel to a plane where the first part is located.

11. The display assembly according to claim 10, wherein the spacing between two adjacent grooves is greater than or equal to the dimension of the at least one groove in the set direction.

12. The display assembly according to claim 11, wherein the at least one groove comprises a bottom surface and a side surface connected to the bottom surface; and
wherein an angle between the bottom surface and the side surface is greater than or equal to 90°.

13. The display assembly according to claim 12, wherein the plurality of grooves are arranged in an array.

14. The display assembly according to claim 13, wherein a shape of an orthogonal projection of the plurality of grooves on the plane where the at least one first part is located comprises a strip shape, a curve, a circle, an ellipse, or a square.

15. The display assembly according to claim 14, wherein the shape of the orthogonal projection of the plurality of grooves on the plane where the at least one first part is located is a strip shape or a curve; and
in a vertical direction of a length direction of the plurality of grooves, the plurality of grooves are arranged in parallel and at intervals.

16. The display assembly according to claim 15, wherein the support plate comprises a plurality of first parts and at least one second part, and the at least one second part is located between two adjacent first parts; and
at least one the second part is bendable and is capable of driving an adjacent first part to rotate around the at least one second part.

17. The display assembly according to claim 16, wherein the display panel has a plurality of first display parts and at least one second display part, and the at least one second display part is located between two adjacent first display parts; and
wherein the plurality of first display parts are opposite to the plurality of first parts, and the at least one second display part is opposite to the at least one second part.

18. A display assembly, comprising:
a display panel; and
a support plate, disposed on a non-light-exit side of the display panel, wherein the support plate comprises a plurality of first parts and at least one second part, wherein the at least one second part is located between two adjacent first parts, and the plurality of first parts are flat, and the at least one second part is bendable, and the plurality of first parts are capable of rotating around the at least one second part; and
wherein at least one first part of the plurality of first parts comprises a plane part and a groove part connected to each other;
wherein at least one groove extends in a side of the groove part that faces away from the display panel, wherein a depth of the at least one groove is less than a thickness of the support plate in a third direction, and the third direction is a thickness direction of the display panel, and a first spacing exists between at least one edge of the at least one groove and an edge of the at least one first part in a second direction, and the second direction is a direction parallel to a rotation axis of the at least one first part;
wherein the plane part comprises at least one adsorption sub-part, and the at least one adsorption sub-part and the at least one groove are staggered, and a side surface, that faces away from the display panel, of the at least one adsorption sub-part is a first surface, and the first surface is a continuous plane; and
wherein a part, in the plane part, other than the at least one adsorption sub-part is a set part, and a side surface, that faces away from the display panel, of the set part is a second surface, the first surface is flush with the second surface, and in the thickness direction of the display panel, a thickness of the adsorption sub-part is equal to a thickness of the set part.

19. The display assembly according to claim 18, wherein the at least one groove comprises two or more grooves.

20. The display assembly according to claim 18, wherein a shape of the at least one adsorption sub-part comprises a circle, a square, a ring, or a frame.

\* \* \* \* \*